US009930748B1

(12) United States Patent
Scenini

(10) Patent No.: US 9,930,748 B1
(45) **Date of Patent: *Mar. 27, 2018**

(54) SYNCHRONIZATION FOR LIGHT-SOURCE DRIVER CIRCUITRY

(71) Applicant: Infineon Technologies AG, Neubiberg (DE)

(72) Inventor: Andrea Scenini, Montegrotto Terme (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,228

(22) Filed: Apr. 27, 2017

(30) Foreign Application Priority Data

Apr. 21, 2017 (EP) .................................... 17425044

(51) Int. Cl.
*H05B 33/08* (2006.01)
*H05B 37/02* (2006.01)
*H04N 5/70* (2006.01)

(52) U.S. Cl.
CPC ....... *H05B 33/089* (2013.01); *H05B 33/0845* (2013.01)

(58) Field of Classification Search
None
See application file for complete search history.

(56) References Cited

U.S. PATENT DOCUMENTS 6,031,343 A * 2/2000 Recknagel ............... A63D 1/08 315/292
9,781,800 B2 10/2017 Scenini et al.
2004/0254756 A1 12/2004 Strittmatter
2014/0042927 A1* 2/2014 Tomasovics ....... H05B 33/0842 315/291
2015/0009204 A1 1/2015 Chaji
2016/0345392 A1 11/2016 Scenini et al.
2016/0345397 A1 11/2016 De Cicco et al.
2017/0135169 A1* 5/2017 Panek ................ H05B 33/0827

FOREIGN PATENT DOCUMENTS

DE 102015218248 A1 3/2016
DE 102016109296 A1 11/2016

OTHER PUBLICATIONS

U.S. Appl. No. 15/355,779, filed by Andrea Scenini et al., filed Nov. 18, 2016.

(Continued)

*Primary Examiner* — Dedei K Hammond
(74) *Attorney, Agent, or Firm* — Shumaker & Sieffert, P.A.

(57) ABSTRACT

In some examples, a device includes at least two light sources, buffer circuitry configured to receive a bit stream, and driver circuitry configured to receive the bit stream from the buffer circuitry and to drive the at least two light sources based on the bit stream. In some examples, the device also includes monitor circuitry configured to determine a voltage drop across each light source of the at least two light sources and snooping circuitry configured to read, as the buffer circuitry receives the bit stream, a specific bit of the bit stream and to cause the monitor circuitry to determine a voltage drop across the specific light source based on a value of the specific bit.

20 Claims, 16 Drawing Sheets

(56) References Cited

OTHER PUBLICATIONS

U.S. Appl. No. 15/260,055, filed by Maurizio Galvano et al., filed Sep. 8, 2016.
U.S. Appl. No. 15/499,400, by Andrea Scenini, filed Apr. 27, 2017.
Extended European Search Report and Written Opinion from counterpart European Application No. 174250440.9, filed on Sep. 29, 2017, 8 pp.

* cited by examiner $$\text{Stream pointer}_{\text{down counter}} = 8 * column + \begin{cases} row & if\ col(0) =' 0' (even\ colum) \\ (15 - row) & if\ col(0) =' 1' (odd\ column) \end{cases}$$

SYNCHRONIZATION FOR LIGHT-SOURCE DRIVER CIRCUITRY

TECHNICAL FIELD

This disclosure relates to circuitry for driving light sources such as light emitting devices.

BACKGROUND

Driver circuitry may operate, or drive, one or more light sources, such as light emitting diodes (LEDs). The driver circuitry may control a light intensity output by a light source by varying an average amount of electrical current flowing through the light source. For example, the driver circuitry may increase a duty cycle of an electrical current delivered to a light source to increase a light intensity generated by the light source. Similarly, the driver circuit may decrease the duty cycle of the electrical current delivered to a light source to decrease the light intensity generated by the light source. At high switching frequencies, a human eye may perceive a change in the duty cycle of the electrical current as a change in the brightness or intensity of the light generated by the light source.

SUMMARY

This disclosure describes a device including at least two light sources and monitor circuitry configured to determine a voltage drop across each light source. The monitor circuitry may be configured to determine the voltage drop for a specific light source when the specific light source is on or off, i.e., generating or not generating light based on an electrical current passing through the specific light source. The device may receive a bit stream and may include driver circuitry configured to drive the light sources based on the bit values in each frame of the bit stream.

To determine whether a specific light source will be generating light during the next frame of the bit stream, the device includes snooping circuitry that may be configured to read a specific bit from the incoming frame of the bit stream. The specific bit may indicate whether the specific light source will be generating light during the next frame. By reading the specific bit as the device receives the specific bit, the snooping circuitry may cause the monitor circuitry to determine the voltage drop across the specific light source based on the value of the specific bit. Thus, the device may synchronize the monitor circuitry to whether the driver circuitry will be driving the specific light source during the next frame.

In some examples, a device includes at least two light sources, buffer circuitry configured to receive a bit stream, and driver circuitry configured to receive the bit stream from the buffer circuitry and to drive the at least two light sources based on the bit stream. In some examples, the device also includes monitor circuitry configured to determine a voltage drop across each light source of the at least two light sources and snooping circuitry configured to read, as the buffer circuitry receives the bit stream, a specific bit of the bit stream and to cause the monitor circuitry to determine a voltage drop across the specific light source based on a value of the specific bit.

In some examples, a method includes receiving a bit stream and reading, while receiving the bit stream, a specific bit of the bit stream. The method further includes driving at least two light sources based on the bit stream and determining a voltage drop across a specific light source of the at least two light sources based on a value of the specific bit In some examples, a device includes at least two light sources, buffer circuitry configured to receive a bit stream, and driver circuitry configured to receive the bit stream from the buffer circuitry and to drive the at least two light sources based on the bit stream. The device further includes monitor circuitry configured to determine a voltage drop across each light source of the at least two light sources. The device also includes snooping circuitry configured to read, as the buffer circuitry receives the bit stream, a specific bit of the bit stream and to cause the monitor circuitry to determine a voltage drop across the specific light source based on a value of the specific bit. The device includes controller circuitry configured to determine whether the voltage drop across the specific light source is within an acceptable voltage window and to cause the driver circuitry to increase or decrease the voltage drop across the specific light source in response to determining that the voltage drop across the specific light source is not within the acceptable voltage window.

The details of one or more examples are set forth in the accompanying drawings and the description below. Other features, objects, and advantages will be apparent from the description and drawings, and from the claims.

DETAILED DESCRIPTION

A device may include at least two light sources and driver circuitry configured to selectively drive each light source of the at least two light sources. The driver circuitry may be configured to drive the light sources based on the bit values in each frame of a bit stream received by the device. The device may also include monitor circuitry configured to determine the voltage drop across each of the light sources. Additionally or alternatively, the monitor circuitry may be configured to determine the voltage drop across a current source in the driver circuitry. The monitor circuitry may also be configured to determine whether there is a short circuit or open circuit across the specific light source. In some examples, the voltage drop across a specific light source may indicate whether the specific light source is functioning properly, whether there is a short circuit or open circuit across the specific light source, and/or whether the temperature of the specific light source is higher than a desirable operating temperature.

To determine the voltage drop across the specific light source, the device may include snooping circuitry configured to read a specific bit in a first frame of the bit stream as buffer circuitry of the device receives the first frame. The specific bit in the first frame that is received by the buffer circuitry may indicate whether the driver circuitry will drive the specific light source during a second frame. In some examples, the second frame may immediately follow the first frame. By reading the specific bit as the buffer circuitry receives the first frame, the snooping circuitry may cause the monitor circuitry to determine a voltage drop across a specific light source during the second frame.

Thus, the snooping circuitry may read the specific bit before the driver circuitry uses the specific bit to drive the specific light source. The snooping circuitry may also be configured to determine whether to cause the monitor circuitry to determine the voltage drop across the specific light source. In some examples, the snooping circuitry may be configured to determine whether the specific light source will be on or off during the next frame and to cause the monitor circuitry to determine the voltage drop based on the determination whether the specific light source will be on or off during the next frame. In other examples, the snooping circuitry may receive a request signal indicating a requested state for the specific light source, and the snooping circuitry may be configured to cause the monitor circuitry to determine the voltage drop based on comparing the requested state to the value of the specific bit.

Figure 1:
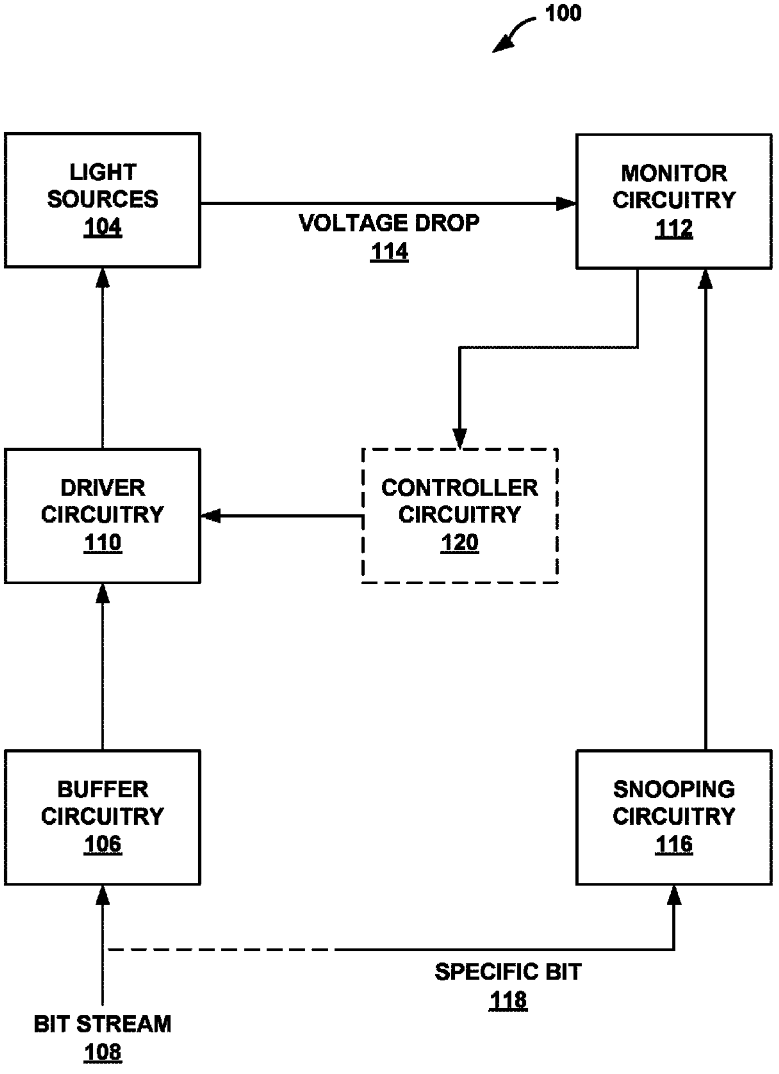
FIG. 1 is a conceptual block diagram of a device including at least two light sources, in accordance with some examples of this disclosure.

FIG. 1 is a conceptual block diagram of a device 100 including at least two light sources 104, in accordance with some examples of this disclosure. Device 100 may include light sources 104, buffer circuitry 106, driver circuitry 110, monitor circuitry 112, snooping circuitry 116, and optional controller circuitry 120. In some examples, device 100 may be a lighting device for a vehicle, a building, and/or any other system that includes a lighting device.

Light sources 104 may include two or more light sources such as light-emitting diodes (LEDs) or any other suitable light sources. Light sources 104 may be arrayed in a matrix or grid formation, and each light source may be a pixel. In some examples, light sources 104 may include one thousand and twenty-four light sources that are arrayed in a grid of thirty-two light sources by thirty-two light sources. Each of light sources 104 may be numbered in sequential order (see FIG. 11). For a first frame of bit stream 108, some of light sources 104 may be on, and some of light sources 104 may be off. From the first frame to a second frame of bit stream 108, some of light sources 104 that were on in the first frame may remain on for the second frame, and some of light sources 104 that were on in the first frame may switch off for the second frame.

Buffer circuitry 106 may be configured to receive bit stream 108, which may include a series of bits. Each bit of bit stream 108 may correspond to a light source of light sources 104. In some examples, buffer circuitry 106 may include a shift register with a number of bits that may be equal or approximately equal to the number of light sources in light source 104. As a shift register, buffer circuitry 106 may include a cascade of flip flops sharing the same clock input. When buffer circuitry 106 has finished receiving a first frame of bit stream 108, buffer circuitry 106 may deliver bit stream 108 to driver circuitry 110 and begin receiving a second frame of bit stream 108. Each frame of bit stream 108 may include a number of bits that is equal to or approximately equal to the number of light sources in light sources 104.

In some examples, buffer circuitry 106 may be configured to deliver a first frame of bit stream 108 to driver circuitry 110 in response to receiving an update signal. In some examples, the update signal may include a pulse or high digital value to indicate the end of each frame of bit stream 108. As used herein, the terms "receiving an update signal" and "delivering an update signal" may mean receiving or delivering the high pulse of the update signal. The high pulse of the update signal may indicate that buffer circuitry 106 has received bit stream 108. Device 100 may also include error-checking circuitry configured to determine whether each frame includes errors. If the error-checking circuitry determines that the first frame includes an error, device 100 may not deliver an update signal to cause buffer circuitry 106 to deliver the first frame of bit stream 108 to driver circuitry 110. If the error-checking circuitry does not determine that a frame includes an error, device 100 may be configured to generate and deliver the update signal to the circuits of FIG. 1. In response to receiving a high pulse of the update signal, buffer circuitry 106 may be configured to deliver a frame of bit stream 108 to driver circuitry 110.

Bit stream 108 may include one or more frames, where each frame of bit stream 108 may include one or more bits such as specific bit 118. Bit stream 108 may include a series of frames, where each frame includes a series of digital bits. Each bit of bit stream 108 may be a command signal to driver circuitry 110 for a light source of light sources 104. Driver circuitry 110 may be configured to transmit each bit to a current source for the respective light source of light sources 104. Each bit may command the respective current source to deliver electrical current to the respective light source of light sources 104.

Driver circuitry 110 may be configured to receive bit stream 108 from buffer circuitry 106. Driver circuitry 110 may also be configured to drive light sources 104 based on the bits in bit stream 108. For example, driver circuitry 110 may be configured to drive a first light source based on a first bit and to drive a second light source based on a second bit. In some examples, a high bit such as a “1” in a frame may cause driver circuitry 110 to drive the corresponding light source during the frame, and a low bit such as a “0” may cause driver circuitry 110 to refrain from driving the corresponding light source.

If the frame rate for device 100 is one frame per five microseconds (i.e., two hundred kilohertz), each frame of bit stream 108 may cause driver circuitry 110 to drive, or refrain from driving, light sources 104 for five microseconds. To brighten or dim a light source of light sources 104, processing circuitry may increase or decrease the percentage of high bits in the frames of bit stream 108. At one frame per five microseconds, driver circuitry 110 may drive a specific light source based on two hundred thousand frames of a specific bit during a one-second time period. The apparent brightness of the specific light source to a human eye may be based on the percentage of frames in which the specific bit that corresponds to the specific light source has a high value.

Monitor circuitry 112 may be configured to determine voltage drop 114 across a specific light source of light sources 104. Monitor circuitry 112 may be configured to determine the voltage drop across each light source of light sources 104 by using one or more multiplexers. The multiplexers may allow monitor circuitry 112 to measure the voltage drop across one or more of the light sources during each frame of bit stream 108. In some examples, monitor circuitry 112 may include one or more levels of multiplexers. The first level of multiplexers may include a number of inputs that is equal to the number of light sources 104. Monitor circuitry 112 may include an analog-to-digital converter (ADC) configured to receive an analog output signal of the last level of multiplexers, which may indicate the voltage drop across a light source. The ADC may be configured to convert the analog output signal to a digital signal. The digital signal may indicate the approximate amplitude of the voltage drop across a light source of light sources 104.

In some examples, monitor circuitry 112 may be configured to determine the voltage drop across a first light source during a first frame, determine the voltage drop across a second light source during a second frame, and so on. Whether monitor circuitry 112 continues monitoring the first light source during successive frames depends on whether a user selects a different light source, a different current source, or a different bit. The user may be a control device that includes processing circuitry configured to, from time to time, requests light source(s), current source(s), and/or bit(s) to be monitored. In some examples, monitor circuitry 112 may be capable of determining the voltage drop across only one light source during each frame. In other examples, monitor circuitry 112 may be capable of determining the voltage drop across more than one light source during each frame.

In accordance with the techniques of this disclosure, snooping circuitry 116 may be configured to read specific bit 118 as buffer circuitry 106 receives bit stream 108. Snooping circuitry 116 may be further configured to cause monitor circuitry 112 to determine voltage drop 114 across a specific light source based on the value of specific bit 118. For example, if the value of specific bit 118 is a “1”, snooping circuitry may be configured to cause monitor circuitry 112 to determine voltage drop 114 across the specific light source. If the value of specific bit 118 is a “0”, snooping circuitry may be configured to refrain from causing monitor circuitry 112 to determine voltage drop 114 across the specific light source. In some examples, snooping circuitry 116 may cause monitor circuitry 112 to determine voltage drops across light sources that are on. In other examples, snooping circuitry 116 may cause monitor circuitry 112 to determine a voltage drop across a specific light source during a frame, regardless of whether the specific light source is on or off during the frame.

After reading specific bit 118, snooping circuitry 116 may be configured to cause monitor circuitry 112 in response to receiving an update signal, such as in response to receiving a high pulse of the update signal. Snooping circuitry 116 may be configured to read specific bit 118 before receiving the pulse of the update signal. After snooping circuitry 116 receives the update signal indicating the end of the first frame, snooping circuitry 116 may be configured to read a bit from the next frame. In some examples, the position of the bit in the next frame may be based on whether device 100 receives user input selecting a light source that is different than the specific light source. If a user selects a different light source or a different bit, snooping circuitry 116 may be configured to read the different bit during the next frame.

If the user does not select a different light source or a different bit, snooping circuitry 116 may be configured to read specific bit 118 as buffer circuitry 106 receives the next frame. Snooping circuitry 116 may be further configured to cause monitor circuitry 112 to determine, as buffer circuitry 106 receives a third frame, a second voltage drop across the specific light source based on a value of specific bit 118. In some examples, the third frame may immediately follow the second frame (i.e., the third frame). Snooping circuitry 116 may be configured to cause monitor circuitry 112 to continue monitoring the specific light source until a user selects a different light source or until specific bit 118 has an inactive value (e.g., a “0”) in a later frame.

Snooping circuitry 116 may be configured to determine a position of specific bit 118 in bit stream 108 based on a position of the specific light source. In some examples, the specific light source may be positioned in a matrix (i.e., grid) of light sources 104. Snooping circuitry 116 may be configured to determine the position of specific bit 118 in bit stream 108 by at least accessing a lookup table associating positions of bits in bit stream 108 and position of light sources 104 in the matrix.

In some examples, snooping circuitry 116 may include counter circuitry that is configured to count the position of specific bit 118 as buffer circuitry 106 receives bit stream 108. For example, snooping circuitry 116 may determine that specific bit 118 is located in a specific positon with bit stream 108, such as a sixth position. As buffer circuitry 106 receives a frame of bit stream 108, the counter circuitry may count to the specific position. In some examples, the counter circuitry may be configured to increment a count until the count is equal to the number of the specific position. The counter circuitry may then be configured to read specific bit 118 in response to counting the position of specific bit 118.

Snooping circuitry 116 and/or monitor circuitry 112 may be configured to determine whether the specific light source is on or will be on before monitor circuitry 112 determines the voltage drop across the specific light source. In some examples, monitor circuitry 112 may be configured to determine the voltage drop across the specific light source if and only if the specific light source is or will be on during the voltage measurement. In other examples, monitor circuitry 112 may be configured to determine the voltage drop across the specific light source regardless of whether the specific light source is or will be on during the voltage measurement. The capability of snooping circuitry 116 to read specific bit 118 in a frame of bit stream 108 as the frame is received by buffer circuitry 106 may allow device 100 to synchronize the determination of a voltage drop across a specific light source. The determination may be synchronized by selecting a light source that will be on during the measurement, by selecting a light source that will be off during the measurement, and/or by selecting a light source based on the value of specific bit 118.

Controller circuitry 120 may be configured to determine whether voltage drop 114 is within an acceptable voltage window. The acceptable voltage window may include an upper threshold that is less than an open-circuit voltage and a lower threshold that is more than a short-circuit voltage. The thresholds of the acceptable voltage window may be established based on acceptable operating temperatures, such that determining voltage drop 114 outside of the acceptable voltage window may indicate an unacceptable temperature. Controller circuitry 120 may be configured to cause driver circuitry 110 to increase or decrease voltage drop 114 across the specific light source in response to determining that voltage drop 114 across the light source is not within the acceptable voltage window.

In accordance with the techniques of this disclosure, snooping circuitry 116 may be configured to read specific bit 118 as buffer circuitry 106 receives a first frame of bit stream 108. Snooping circuitry 116 may be configured to determine the value of specific bit 118 and cause monitor circuitry 112 to determine voltage drop 114 based on the value of specific bit 118. Snooping circuitry 116 may be configured to read specific bit 118 as buffer circuitry 106 receives the first frame of bit stream 108, so that monitor circuitry can determine voltage drop 114 as driver circuitry 110 is driving light sources 104 based on the first frame of bit stream 108.

For example, snooping circuitry 116 may read specific bit 118 of a first frame of bit stream 108. When buffer circuitry 106 receives an update signal, buffer circuitry 106 may deliver the first frame to driver circuitry 110 and begin receiving a second frame of bit stream 108. Driver circuitry 110 may be configured to drive light sources 104 based on the first frame of bit stream 108. While driver circuitry 110 is driving light sources 104 based on the first frame, snooping circuitry 116 may be configured to cause monitor circuitry 112 to determine voltage drop 114 across the specific light source. By reading specific bit 118 as buffer circuitry 106 receives the first frame, snooping circuitry 116 may prepare monitor circuitry to determine voltage drop 114 as driver circuitry 110 drives light sources 104 based on the first frame. In some examples, snooping circuitry 116 may be configured to compare the value of specific bit 118 to a requested state and cause monitor circuitry 112 to determine the voltage drop based on the comparison of the value of specific bit 118 to the requested state.

Figure 2:
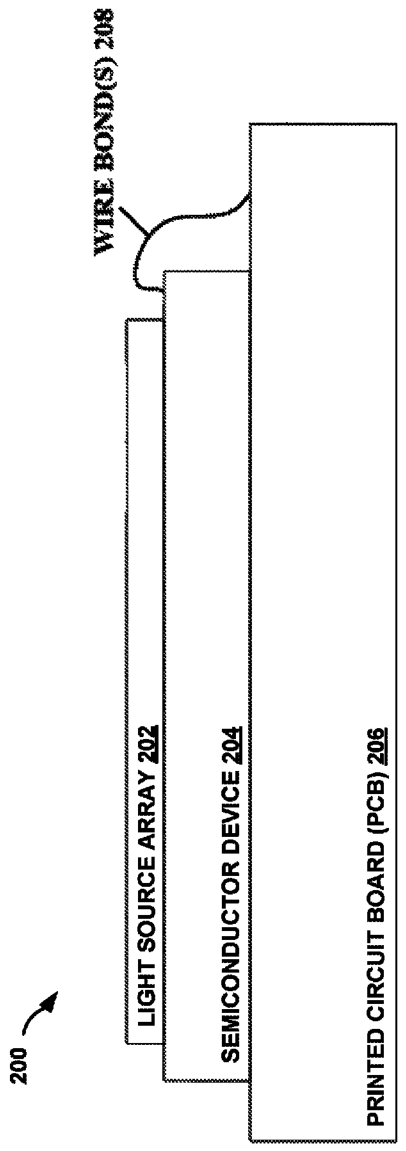
FIG. 2 shows an exemplary arrangement comprising a light emitting diode (LED) array which is placed on top of a semiconductor device, in accordance with some examples of this disclosure.

FIG. 2 shows an exemplary arrangement comprising a light source array 202 which is placed on top of a semiconductor device 204, in accordance with some examples of this disclosure. Device 200 may include light source array 202, semiconductor device 204, printed circuit board (PCB) 206, and wire bond(s) 208. Light source array 202 and semiconductor device 204 may be a chip-on-chip assembly. Light source array 202 may include at least two light sources. Semiconductor device 204 may be arranged on PCB 206. Semiconductor device 204 may be electronically connected to PCB 206 via bond wires 208.

Semiconductor device 204 may comprise at least one of the following: current sources for individual light sources arranged on light source array 202, in particular at least one current source for each light source; a communication interface for driving the light sources and for management purposes; generation of at least one reference current; and diagnosis and protection functionality. For such purposes, semiconductor device 204 may comprise an array of silicon cells, wherein each silicon cell (also referred to as pixel cell) may comprise a current source, which may be directly connected to a light source of light source array 202. In addition, semiconductor device 204 may comprise current source regulation circuitry or any other circuitry as discussed throughout.

In some examples, the at least one current source of semiconductor device 204 may be a part of driver circuitry configured to drive light source array 202 based on a bit stream. The communication interface of semiconductor device 204 may be a part of buffer circuitry configured to receive the bit stream and deliver the bit stream to the driver circuitry. Semiconductor device 204 may be configured to receive a bit stream through bond wire(s) 208 and an electrical connection in PCB 206. In some examples, semiconductor device may include 1,024 current sources, each directly connected to a LED of light source array 202. Semiconductor device 204 may independently control the current sources in order to generate the correct light pattern either in beam shape and intensity.

In some examples, device 200 may be a high-pixel LED driver, where light source array 202 may be an LED array of 1,024 pixels that is mounted on top of a silicon substrate array (i.e., semiconductor device 204) in a chip-on-chip assembly solution. In some examples, semiconductor device 204 may be an intelligent, smart silicon-substrate chip. The smart silicon substrate may include an array of pixel cells called an LED driver matrix and may be placed and directly connected to each respective LED of light source array 202. Each pixel cell of light source array 202 may include an area of 125 μm by 125 μm. The smart silicon substrate may also include common circuitry outside the LED matrix area, where the common circuitry may include, for example, the communication interfaces or diagnosis and protection circuitry. The common circuitry may add to the total volume of device 200, and it may be desirable to have a smaller volume for device 200.

Figure 3:
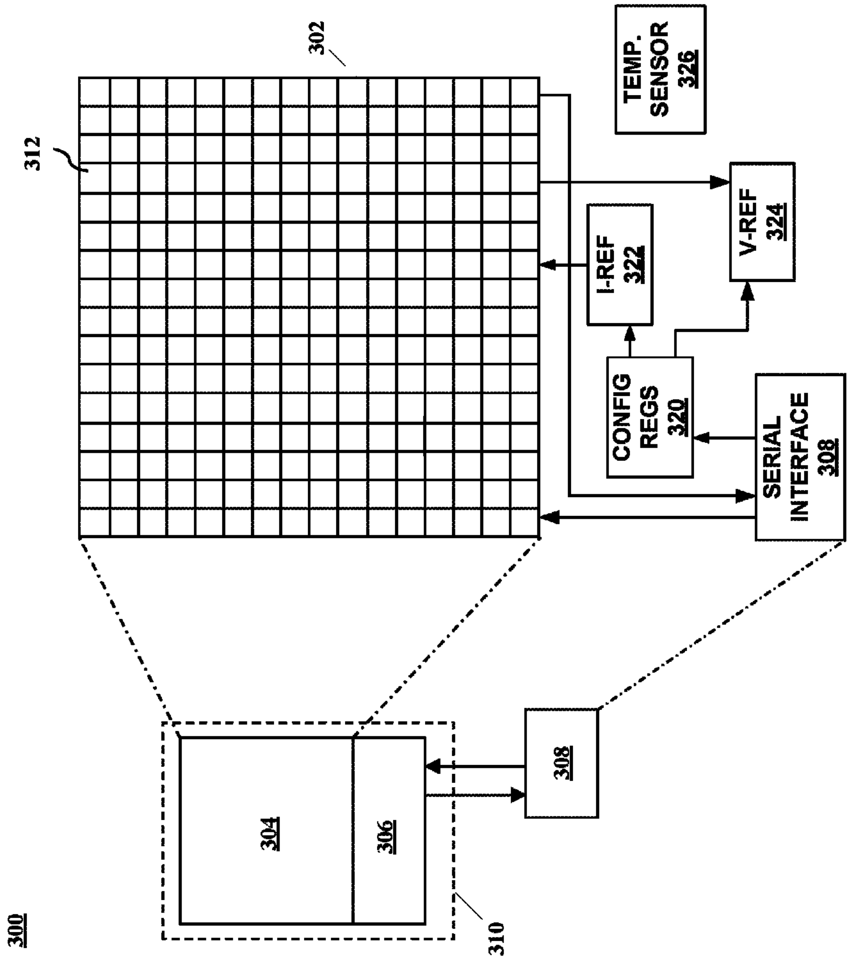
FIG. 3 shows an exemplary block diagram of a matrix of light sources and a semiconductor device comprising driver circuitry, in accordance with some examples of this disclosure.

FIG. 3 shows an exemplary block diagram of a matrix 302 of light sources 312 and a semiconductor device 310 comprising driver circuitry 304, in accordance with some examples of this disclosure. Each pixel of matrix 302 may be represented by at least one light source 312. Driver circuitry 304 may be a portion of semiconductor device 310 that is associated with each one pixel of light source array 202). Semiconductor device 310 may also include circuitry 306. Semiconductor device 310 may be connected to a serial interface 308. Respective light sources 312 of matrix 302 may be controlled via serial interface 308. Matrix 302 may be arranged on top of driver circuitry 304. Driver circuitry 304 may be part of the semiconductor device 204 as shown in FIG. 2 and may comprise a pixel cell area (also referred to as "pixel cell") for each light source 312 of matrix 302. It is an option that driver circuitry 304 has (e.g., substantially) the same area size as matrix 302. In particular, the pixel cell area of driver circuitry 304 may have the same surface area as an individual one light source 312. Light sources 312 of matrix 302 may be directly connected to the pixel cells of driver circuitry 304. Matrix 302 may in particular be arranged on top of driver circuitry 304.

Circuitry 306 may comprise a serial interface for accessing light sources 312 of matrix 302, e.g., one register 320 for configuration purposes, reference current generator 322, reference voltage generator 324 and temperature sensor 326, and may be arranged in an area adjacent or distant to driver circuitry 304. In some examples, circuitry 306 may also include buffer circuitry configured to receive a bit stream and to deliver the bit stream to driver circuitry 304. Matrix 302 may comprise an arbitrary number of light sources (e.g., pixels) arranged in columns and rows. For example, matrix 302 may comprise 256 light sources, 1028 light sources, 2,056 light sources, etc. In the example shown in FIG. 3, matrix 302 comprises sixteen rows and sixteen columns of light sources 312, amounting to two hundred and fifty-six light sources. An LED may be one example of a light source. It may be an option to use any kind of light source, in particular semiconductor light source. It is another option that each light source may be a component comprising at least two semiconductor light sources.

In an exemplary application, each pixel of matrix 302 may occupy a surface area of, for example, less than 150 μm by 150 μm although surface area occupation may be implementation-specific. Any area suitable for a predetermined resolution of light source array 202 may be selected. The semiconductor light source may be arranged in the middle of each pixel cell. Adjacent pixel cells may have a gap between light sources amounting to less than 150 μm. Each light source may have one contact connected to driver circuitry 304 and one contact connected to a common contact, e.g., GND. This is an exemplary scenario; other dimensions, distances and connections may apply accordingly.

With each light source being mounted directly on top of the semiconductor device, each current source is placed in an area defined by the surface area of the pixel cell. In the example provided above, the area amounts to 150 μm−1501 μm=0.022500 $mm^2$. For increasing the resolution in x- and y-dimensions (e.g., 0.50) of the light at long distance and for avoiding extra mechanical components for beam leveling adjustment, a short pitch between the pixel cells is beneficial. In the example provided above, the pitch between pixel cells may be less than 150 μm.

Due to the compact arrangement, a high amount of heat sources may generate different temperatures, which may influence temperature gradients and hence lead to a mismatch between pixels. In addition, the output of each current source per pixel cell may not be directly accessible as the driver circuitry is directly connected to the light sources. Hence, a solution is required that provides at least one of the following: a current source that provides current to the individual light source, which allows switching the light source on or off with high accuracy, optionally providing over-current protection; a diagnostic functionality capable of detecting an open-load and a short to ground of the output channel; a low mismatch between different pixels, i.e., between different current sources; current source regulation circuitry as discussed throughout; etc.

An external device may independently control the state of the pixels of matrix 302 by transmitting a bit stream via serial interface 308. Circuitry 306 may be configured to store the incoming bit stream data in a memory buffer in order to check its integrity. Circuitry 306 may be configured to deliver the bit stream to driver circuitry 304 only if the integrity check is successful. Device 300 may be configured to run a diagnosis of matrix 302, in particular how to monitor the forward voltages of each light source and the variation over time caused for example by a temperature change, for example. Current source outputs may not accessible because they are covered by the light source array. To cope with this limitation, the output net may be observable to the common circuitry part via a group of analog multiplexers that are configured by the system. Circuitry 304 and/or 306 may then convert this voltage by an analog to digital data converter for further processing.

Successive frames of the bit stream may form a pulse-width modulated (PWM) signal to modulate the light sources. Additionally or alternatively, the bit stream may also form a pulse-density modulated (PDM) signal and/or a pulse-frequency modulated (PFM) signal. In some examples, circuitry 306 may indicate a desired state such that the conversion should be executed when the LED is in the desired state. For example, when the desired state is on, the state of the specific light source should stay stable during the conversion. If the PWM generator is not integrated in device 300 but is calculated externally by a microcontroller or by a field-programmable gate array (FPGA) and then transferred to the light source array, it may be difficult to synchronize the diagnostic, for example of an ADC, to a configurable state of the specific light source. The complication may arise from determining the state of the specific light source in a short period of time and consideration of also possible communication errors.

Figure 4A:
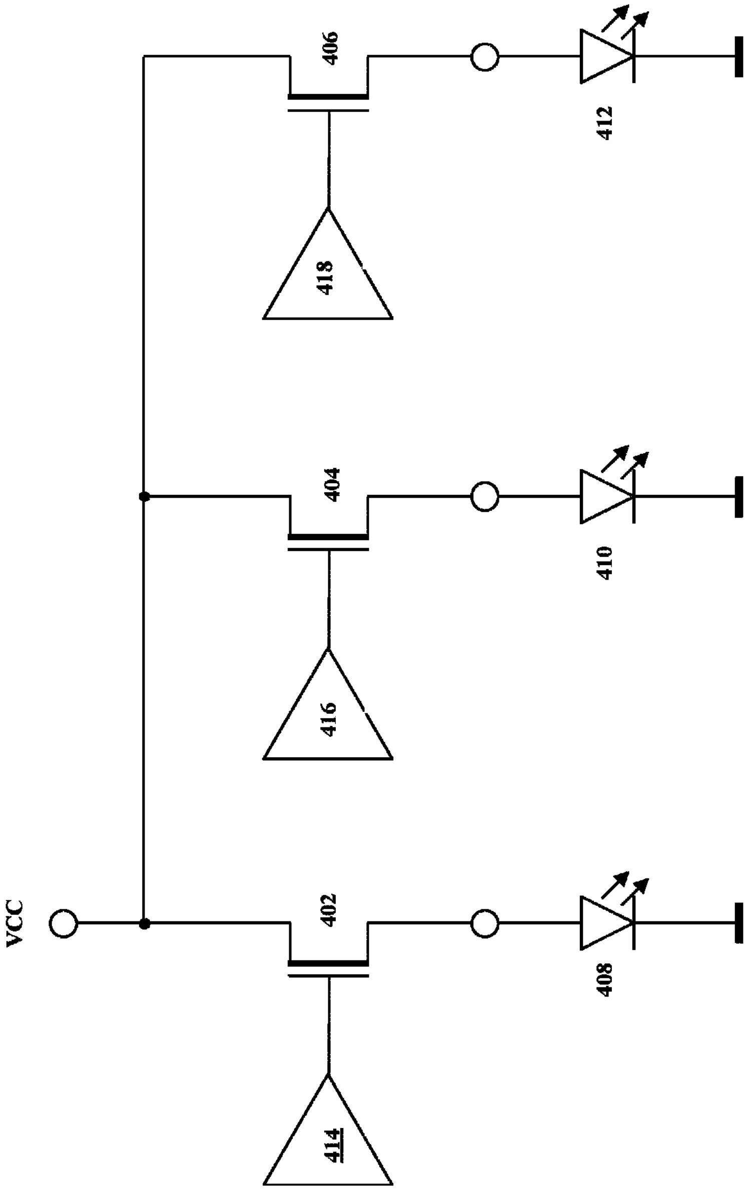
FIG. 4A shows exemplary driver circuitry including high-side current sources, in accordance with some examples of this disclosure.

FIG. 4A shows exemplary driver circuitry including high-side current sources 402, 404, and 406, in accordance with some examples of this disclosure. Each of current sources 402, 404, and 406, each of which being arranged on driver circuitry 304 on top of which light sources 408, 410, and 412 are mounted. In this scenario, light source 408 is arranged on top of current source 402, light source 410 is arranged on top of current source 404 and light source 412 is arranged on top of current source 406.

Each current source 402, 404, and 406 may be an NMOS power stage with the drain connected to supply voltage VCC, and with the source connected with the respective light sources 408, 410, and 412. The gate of each NMOS power stage may be controlled via a corresponding error amplifier 414, 416, and 418, and each error amplifier 414, 416, and 418 may be used to control the output current using an internal reference current. Each error amplifier 414, 416, and 418 may be enabled by a digital or by an analog signal.

In light of the foregoing, driver circuitry 304 may thus comprise a relatively large number of current sources and/or switches on the area available for a pixel cell (in case the driver circuitry is physically below the light source array). Examples presented herein in particular show how an efficient solution for the light source array and the underlying driver circuitry may be realized even if the driver circuitry is arranged on a silicon semiconductor device (e.g., single chip). Examples provided in particular cope with a high number of heat sources as well as heat gradients between current sources of the pixel cells.

Other examples presented herein allow providing driver circuitry comprising in particular at least one of the following: a communication interface for controlling the drivers for each pixel cell; an output current regulation with self-protection against over-current; an open-load and short to ground diagnostic functionality; and a low temperature sensitivity. In some examples, the communication interface may be part of buffer circuitry. This may in particular be achieved by distributing a control logic between a circuitry and the driver circuitry, both integrated on a semiconductor device. The circuitry may be arranged adjacent to the driver circuitry and the driver circuitry may take the same surface area than the light source array, which can be arranged on top of the driver circuitry as explained above. As an option, the circuitry may be arranged in an area adjacent or distant to the driver circuitry.

A challenge is how to efficiently drive the current sources, wherein one current source is placed (or associated with) a pixel cell. As shown in the example described above, the distance between two pixel cells (e.g., less than 150 μm) may set forth limiting restrictions, which makes it difficult to electrically connect all current sources that are arranged below their associated light sources such that they can be driven by the circuitry of the semiconductor device.

Figure 4B:
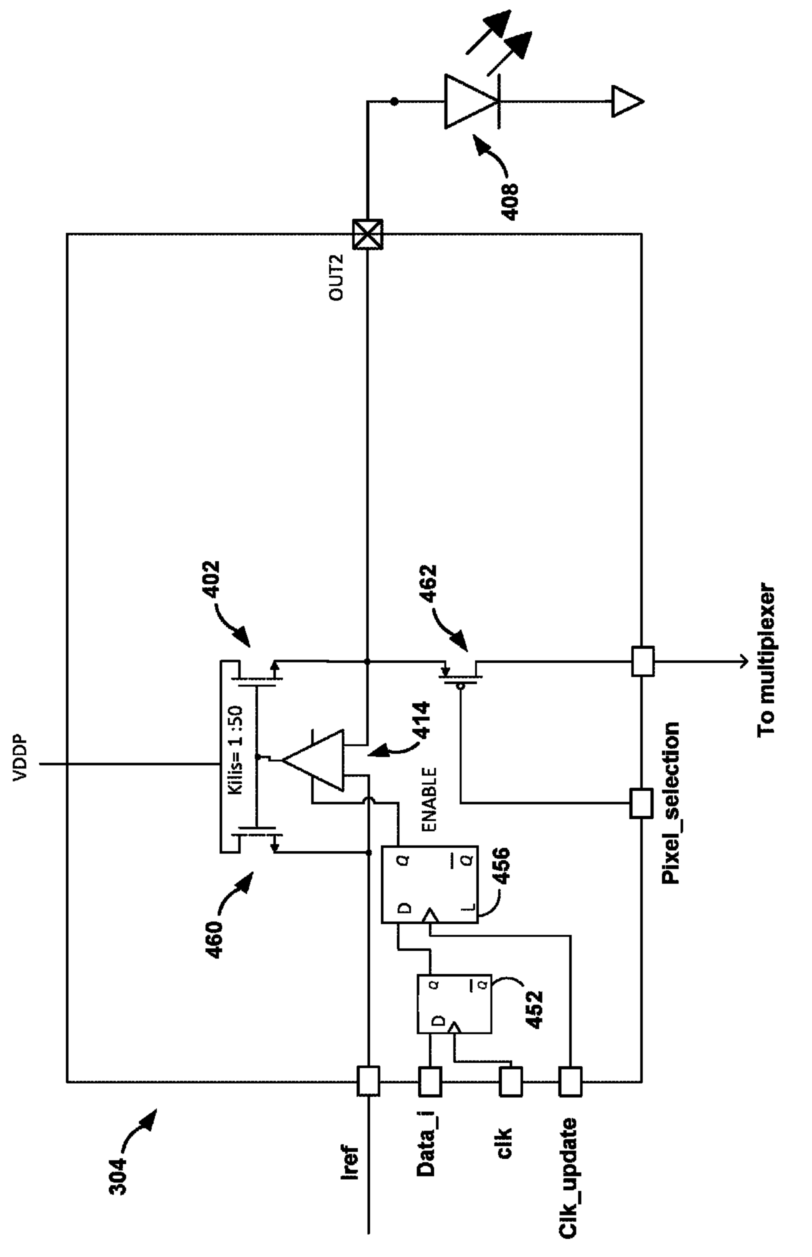
FIG. 4B shows an exemplary driver circuitry for a light source, in accordance with some examples of this disclosure.

FIG. 4B shows an exemplary driver circuitry 304 for light source 408, in accordance with some examples of this disclosure. FIG. 4B may also show buffer circuitry configured to receive and deliver a bit stream to driver circuitry 304. The buffer circuitry may include flip-flops 452 and 456. Flip-flop 452 may be configured to receive a bit of a bit stream at the node labeled "D" and from the node labeled Data_i. When flip-flop 452 receives an active clock signal from the node labeled clk, flip-flop 452 may be configured to output the bit at the node labeled "Q". When flip-flop 456 receives an active clock signal from the node labeled Clk_update, flip-flop 456 may be configured to output the bit at the node labeled "Q". In some examples, the bit may enable error amplifier 414 to drive current source 402 and reference switch 460.

Reference switch 460 may be configured to conduct a lower-amplitude electrical current than the electrical current conducted by current source 402. The KILIS factor between reference switch 460 and current source 402 may be one to fifty. Driver circuitry 304 may be configured to output the reference current conducted by reference switch 460 at the node labeled "Iref". Current source 402 may conduct an electrical current from a power supply labeled VDDP, and driver circuitry 304 may output the electrical current at the node labeled OUT2.

A device of this disclosure may include monitor circuitry configured to determine a voltage drop across light source 408. To determine the voltage drop across light source 408, the monitor circuitry may deliver a control signal through the node labeled Pixel_selection to the control terminal of switch 462. The control signal may cause switch 462 to transmit a voltage signal to a multiplexer (see FIG. 8), where the voltage signal may indicate the voltage drop. The voltage drop across light source 408 may be referred to as the forward voltage of light source 408. In some examples, the voltage drop across light source 408 may indicate the temperature of light source 408, whether there is a short circuit across light source 408, and/or whether there is an open circuit across light source 408.

Figure 5:
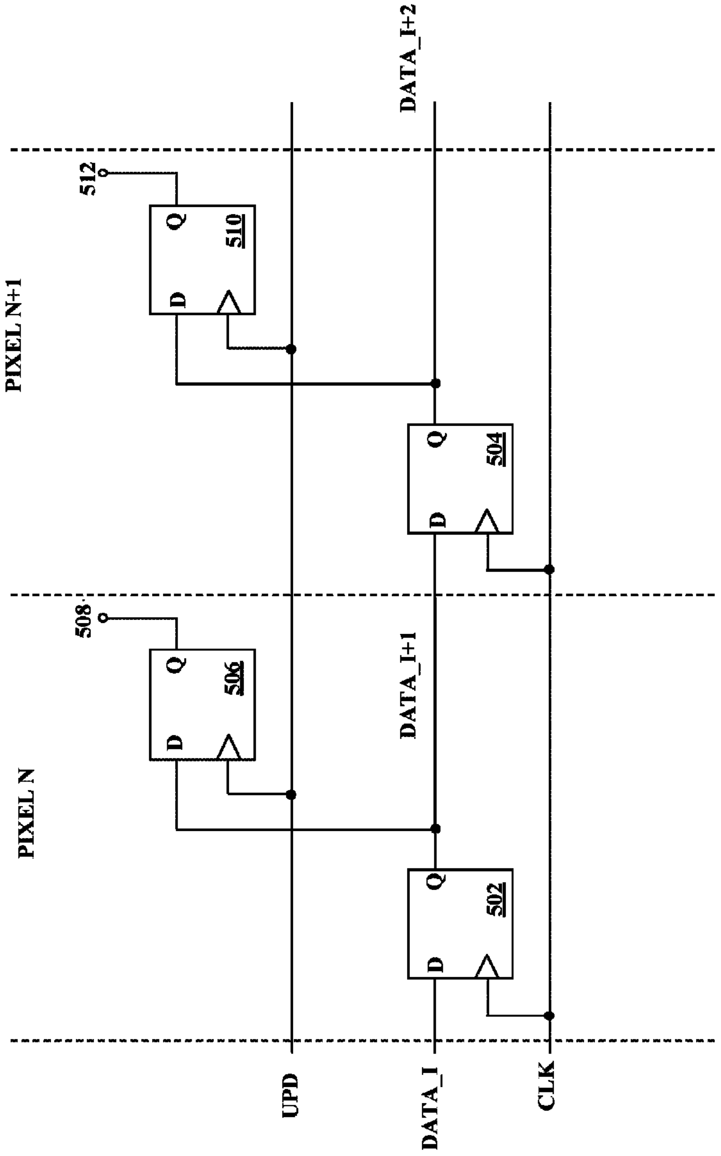
FIG. 5 shows exemplary buffer circuitry for receiving a bit stream, in accordance with some examples of this disclosure.

FIG. 5 shows an exemplary circuitry that may be arranged on a semiconductor device for two pixel cells N and N+1. In this example, circuitry 306 may supply an update signal UPD, a data signal DATA_I and a clock signal CLK. Pixel cell N may deliver a data signal DATA_I+1 to the pixel cell N+1, and pixel cell N+1 may deliver a data signal DATA_I+2 to a subsequent pixel cell (not shown).

In practice, data signal DATA_I may be a bit stream, i.e., a sequence of binary signals (e.g., "0" and "1") that are conveyed to a shift register. Each cell of the shift register may include a D-flip-flop, e.g., D-flip-flop 502 for pixel N and D-flip-flop 504 for pixel N+1. In this example, data signal DATA_I may be connected to the D-input of D-flip-flop 502, the Q-output of D-flip-flop 502 may be connected to the D-input of D-flip-flop 504. Both D-flip-flops 502 and 504 are driven by clock signal CLK. Hence, a sequence of "0" and "1" values may be conveyed to D-flip-flops 502 and 504, wherein with each clock cycle (rising edge) of clock signal CLK, the actual value stored in D-flip-flop 502 is shifted to subsequent D-flip-flop 504 and the subsequent value provided by data signal DATA_I is stored in D-flip-flop 502. According to the example shown, a bit sequence of first 0, then 1 is—after two clock cycles—stored in D-flip-flops 502 and 504 such that D-flip-flop 502 has a value "1" and D-flip-flop 504 has the value "0". D-flip-flops 502 and 504 may be a part of buffer circuitry 106.

A light source, e.g., light source, for pixel N may be driven via a terminal 508 of a register, e.g., D-flip-flop 506. Similarly, a light source for pixel N+1 may be driven via a terminal 512 of a register, e.g., D-flip-flop 510. The D-input of D-flip-flop 506 may be connected to the Q-output of D-flip-flop 502 and the D-input of D-flip-flop 510 may be connected to the Q-output of D-flip-flop 504. The enable (or clock) inputs of both D-flip-flops 506 and 510 may be connected to update signal UPD. When update signal UPD becomes "1" the value stored in D-flip-flop 502 may become visible at the Q-output of D-flip-flop 506 and hence may be used to drive the light source for this pixel N. Accordingly, the value stored in D-flip-flop 504 may become visible at the Q-output of D-flip-flop 510 and hence may be used to drive the light source of pixel N+1. Hence, the shift register exemplarily shown in FIG. 5 comprises two cells, wherein the cell for pixel N may include D-flip-flop 502 and register 506 and the cell for pixel N+1 may include D-flip-flop 504 and register 510.

FIG. 5 shows only an exemplary excerpt of a sequence of two pixel cells. This approach, however, may be applied to a sequence of more than two pixel cells, e.g., a column or a row of a matrix of pixels. In addition, several rows or columns may be connected and represented by an even longer shift register. Insofar, the shift register may be used for providing a data signal to all pixels of a column or line or even matrix and to update the column, line or matrix at once.

The frequency of clock signal CLK may advantageously be high enough to fill the shift registers for such sequence of pixels before the update signal UPD is activated and before the values stored at that time in the respective shift register are used to control the pixels of this sequence, e.g., column or row of the matrix of pixels. Hence, a high refresh rate for each pixel may result in a high resolution of a PWM/PDM/PFM dimming. Therefore, a high clock frequency may be advantageous to store the information in the flip-flop of the shift-register before triggering the update signal. In some examples, buffer circuitry may receive a frame of a bit stream in approximately five microseconds. At the end of a frame of the bit stream, the buffer circuitry may receive an active update signal, causing flip-flops 506 and 510 to deliver the respective bits to respective terminals 508 and 512. Thus, the device may update the status of the light sources for every frame, which may last five microseconds in some examples.

Advantageously, by providing registers (e.g., D-flip-flops according to FIG. 5) in daisy-chain fashion (one pixel driving the next one) and arranging those registers together with the respective pixel cells, a single line may suffice to convey data signal DATA_I to a sequence of pixels, whereas otherwise each pixel would require a separate connection to convey the data signal for controlling this pixel. It is noted that any sort of register or memory may be used to achieve the result described above. The register may be a flip-flop, a latch, register or any other element with a memorizing functionality.

Figure 6:
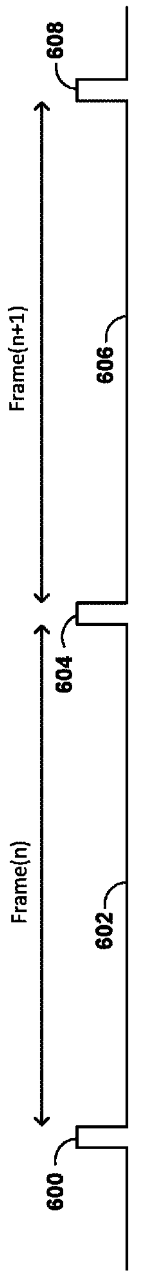
FIG. 6 illustrates a graph of an update signal for two frames of a bit stream, in accordance with some examples of this disclosure.

FIG. 6 illustrates a graph of an update signal for two frames of a bit stream, in accordance with some examples of this disclosure. The update signal is described with respect to device 100 in FIG. 1, although other devices and circuits in other FIGS. may also generate or receive update signals. Device 100 may include a communication serial interface consisting of a clock-, data-, and update-line based on a synchronous clock forward scheme. The clock signal, which may have the same frequency as the bit rate of bit stream 108, where it is provided the clock to be used as reference to sample the data and update signals. A frame may include a new state of all of light sources 104, and the update signal may mark the end of the frame, as well as any error-correction bits or error-checking bits. Device 100 may check incoming data for consistency, for example to determine if the frame length is correct. Device 100 may not store the incoming data, instead forwarding the new data to driver circuitry 110 when the frame ends. When the frame is complete and marked as valid, the new data may be applied to driver circuitry 110 and the states of the pixels are updated.

At the end of each frame of bit stream 108, device 100 may generate an update signal. The high pulse of the update signal may indicate the end of a frame and/or that the frame is free of transmission errors. In some examples, device 100 may deliver the update signal to buffer circuitry 106 and snooping circuitry 116. Device 100 may be configured to generate an update signal based on determining that a frame of bit stream 108 is complete and further based on not detecting any errors in the frame. Device 100 may be configured to check bit stream 108 for consistency, for example if frame length is correct.

During the time period that the update signal has low amplitude 602, buffer circuitry 106 may be receiving Frame (n) of bit stream 108 and driver circuitry 110 may be driving light sources 104 based on Frame(n−1) of bit stream 108. During the time period that the update signal has low amplitude 606, buffer circuitry 106 may be receiving Frame (n+1) of bit stream 108 and driver circuitry 110 may be driving light sources 104 based on Frame(n) of bit stream 108.

Buffer circuitry 106 may be configured to deliver the frame of bit stream 108 to driver circuitry 110 in response to receiving the update signal. "Receiving the update signal," as used herein, means receiving a high pulse of the update signal, such as one of pulses 600, 604, and 608. Snooping circuitry 116 may be configured to cause monitor circuitry 112 to determine voltage drop 114 in response to receiving the update signal, i.e., receiving one of high pulses 600, 604, and 608.

Figure 7:
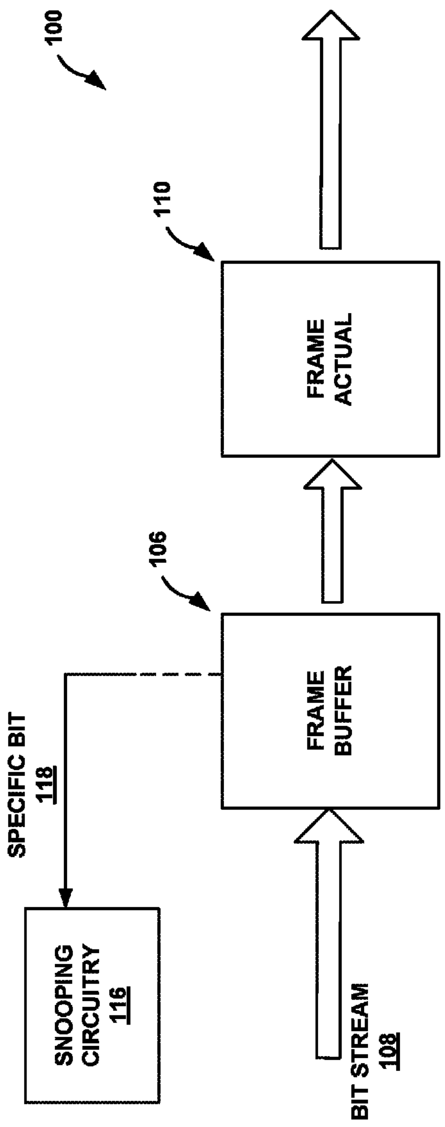
FIG. 7 is a conceptual block diagram of the device of FIG. 1, in accordance with some examples of this disclosure.

FIG. 7 is a conceptual block diagram of device 100, in accordance with some examples of this disclosure. Buffer circuitry 106 ("frame buffer") may be configured to receive a first frame of bit stream 108. As buffer circuitry 106 receives the first frame, snooping circuitry 116 may be configured to read specific bit 118. Buffer circuitry 106 may be configured to hold and/or shift the first frame until buffer circuitry 106 receives an update signal. When buffer circuitry 106 receives the update signal, buffer circuitry 106 may be configured to deliver the first frame to driver circuitry 110 ("frame actual").

When driver circuitry 110 receives the first frame of bit stream 108, driver circuitry 110 may be configured to drive light sources 104 based on the first frame. As driver circuitry 110 is driving light sources 104 based on the first frame, buffer circuitry 106 may be receiving a second frame of bit stream 108. Driver circuitry 110 may be configured to store the first frame until buffer circuitry 106 and/or driver circuitry 110 receives an update signal. Driver circuitry 110 may be configured to update the states of light sources 104 based on each frame that driver circuitry 110 receives.

Buffer circuitry 106 may be implemented with a shift register acting as a frame buffer. In some examples, buffer circuitry 106 and/or driver circuitry 110 may include a shadow register holding the actual state of the pixels (see FIG. 5). The data is shifted into a shift register and as soon as the phase shift is completed, the data is written into the shadow register during the high-phase or high pulse of the update signal. The output of the shadow register may be connected to the respective pixel cell: if all the shift registers and shadow registers are placed in the common part of the silicon the consequence may be an increase of area. The increase in area may result in usage of all of the available metal connection and therefore routing congestion issues.

The shift register and shadow registers may be distributed across the pixel matrix with a slice in each pixel cell: in this way each pixel driver may drive the next one in a sort of daisy-chain. FIG. 5 shows an example of a serial interface slice including a flip flop (shift) and a latch (store element) placed in each cell. As a consequence, there may be no information in the common circuitry about the status of the pixels in order to not have a bigger area overhead (overhead may be equal to die area outside matrix area that in theory is useless).

Figure 8:
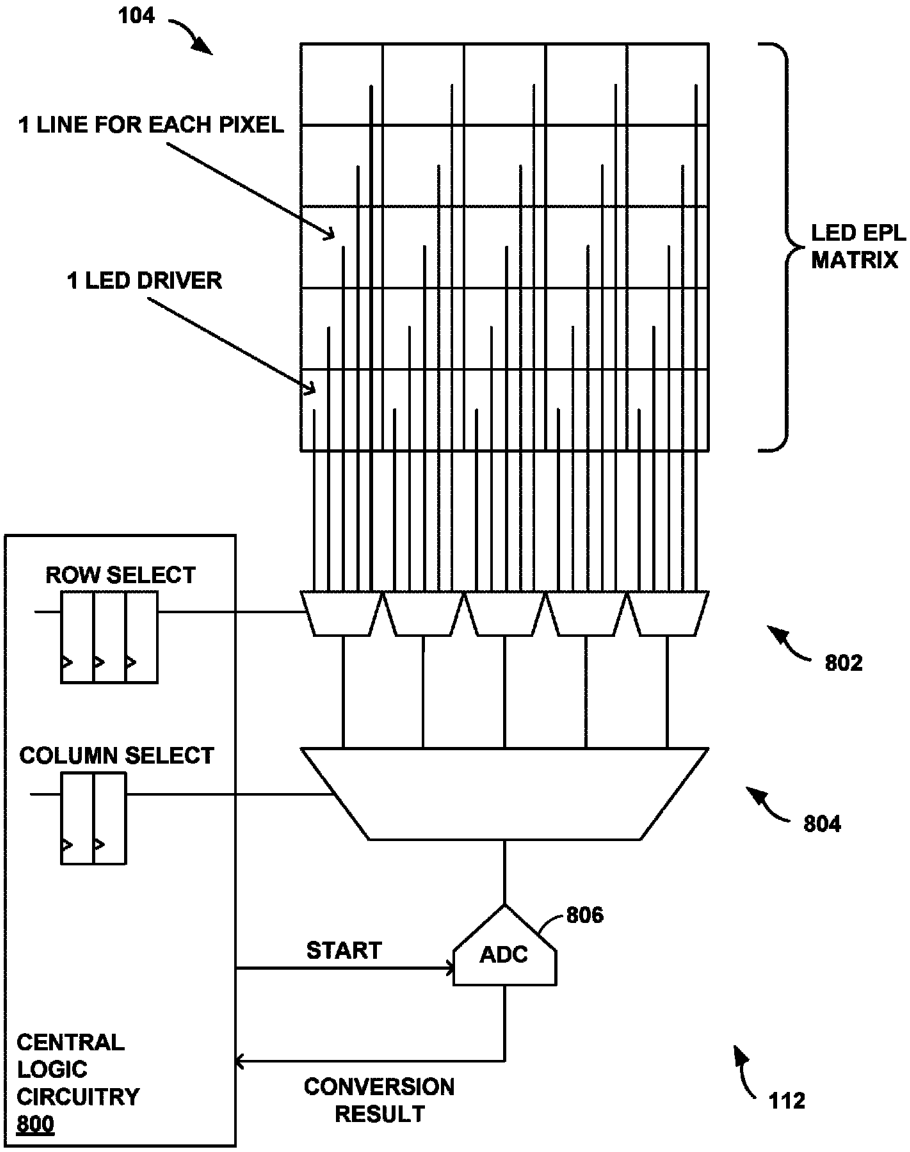
FIG. 8 illustrates monitor circuitry for determining a voltage drop across at least two light sources, in accordance with some examples of this disclosure.

FIG. 8 illustrates monitor circuitry 112 for determining a voltage drop across at least two light sources 104, in accordance with some examples of this disclosure. At a system level, it may be important to have the option to monitor the forward voltage of light sources 104 to determine, for example, an indication of the temperature of each of light sources 104. The output voltages of the current sources may not be directly accessible because the pixels may be covered by the light source array chip. The pixel under monitor may be selectable by the user via a dedicated register. Analog multiplexers may be implemented in monitor circuitry 112 in order to have the selected output node accessible. The ADC may convert the selected voltage for further processing by a digital signal processor or a microcontroller. The ADC may be integrated in driver circuitry 110 or monitor circuitry 112 together with control logic such as central logic circuitry 800.

The system selects the pixel and the desired state for the conversion, and then the system requests an ADC conversion. The task of central logic circuitry 800 is to synchronize the start of the ADC conversion to the actual state of the light sources. The state of the light source may not be known outside the pixel cell, and the central logic circuitry 800 may have to reconstruct such information. To avoid an overly burdensome reconstruction, snooping circuitry may look at or "snoop into" the incoming serial stream going to the shift register spread over the pixel matrix. The snooping circuitry may extract the bit corresponding to the pixel to be monitored. Additionally, the coherence with the matrix may be more likely because an invalid frame may not update the shadow register or the light source status flag. Central logic circuitry 800 may use the light source status flag to handle the ADC conversion, starting it in the right moment and eventually aborting it if the light source toggles during the conversion.

Central logic circuitry 800 may be configured to select a row and a column for a specific light source of light sources 104. Central logic circuitry 800 may be configured to deliver control signals to multiplexers 802 and 804. Multiplexer 804 may be configured to deliver an output signal to ADC 806 for conversion of the analog signal to a digital signal.

Multiplexers 802 may be configured to configured to receive, as inputs, voltage drop connections for each light source of light sources 104. Each of light sources 104 may include an electrical connection to one of multiplexers 802. As depicted in FIG. 8, light sources 104 may include five rows and five columns. In the example of FIG. 8, all of the light sources of a column may be electrically connected as inputs to one of multiplexers 802. Central logic circuitry 800 may be configured to connect one of light sources 104 to ADC 806 through multiplexers 802 and 804.

Central logic circuitry 800 may be configured to generate and/or receive inputs for row select and column select. For example, central logic circuitry 800 may select a specific light source at row one and column one. Central logic circuitry 800 may be configured to select the row and column based on the mapping of each of light sources 104. In some examples, central logic circuitry 800 may be configured to determine the row and column of the specific light source and to transmit the row and column coordinates to mapping circuitry. The mapping circuitry may be configured to convert the row and column coordinates to a position of a specific bit in a frame of a bit stream. Snooping circuitry may be configured to read the value of the specific bit based on the position determined by the mapping circuitry.

The system may be simplified by letting the driver circuitry autonomously manage the light source forward voltage diagnostic. The master chip may request a conversion to a dedicated pixel in a defined, or requested, state and then either read back the converted digital value or an error message if feature implemented. If multiple driver circuits are present the synchronization may be relatively simple, as compared to other devices that lack snooping circuitry. The snooping circuitry may synchronize an embedded ADC to the light source status for an intelligent silicon substrate designed to drive a matrix including light sources. By reading the specific bit as the buffer circuitry receives the bit stream, the snooping circuitry may be configured to determine the status of the LED under diagnosis and send the status to the ADC controller. In some examples, a transmission error may cause the snooping circuitry to not send the status to the ADC controller.

In some examples, a device of this disclosure may be part of an adaptive driving beam front light system for a vehicle. The device may also be used for lighting, automotive, aviation, and/or any other suitable applications. The snooping circuitry of this disclosure helps the system to manage the monitoring of the forward voltage drop of each of light sources. The system may use voltage-drop information as a temperature monitor and to improve the thermal management of the system, reducing either the worst case margins or the thermal dissipation structures.

Figure 9:
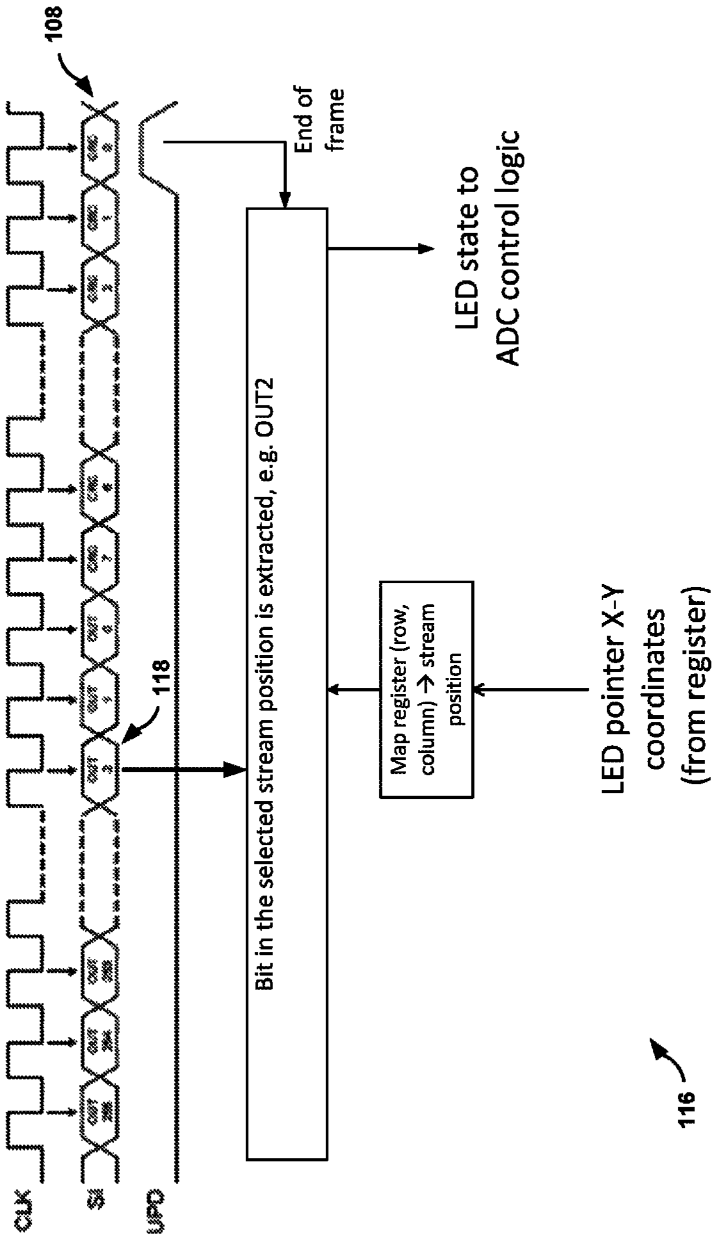
FIG. 9 illustrates snooping circuitry configured to read a bit from a bit stream, in accordance with some examples of this disclosure.

FIG. 9 illustrates snooping circuitry 116 configured to read bit 118 from bit stream 108, in accordance with some examples of this disclosure. FIG. 9 depicts bit stream 108 as including two hundred and fifty-six bits in a frame and eight cyclic redundancy check (CRC) bits after the end of the frame of bit stream 108. In some examples, bit stream 108 may be received by serial interface (SI) 308 of FIG. 3. FIG. 9 also depicts a clock signal with a frequency equal to the bit rate of bit stream 108. FIG. 9 also depicts an update signal (UPD) with a high pulse at the end of the CRC bits.

In an example implementation, a user may write the pixel coordinates register (X-Y coordinates, for example) and snooping circuitry 116 may calculate, from these coordinates, the corresponding position of specific bit 118 in bit stream 108. Snooping circuitry 116 may use the shift position to extract the light source state (i.e., specific bit 118) out of bit stream 108. The light source state signal going to the ADC control logic may be updated only at the end of the frame, i.e. when update signal is high, in order to have a temporal coherence with the state stored in the pixel. Additionally, in case of any transmission errors the LED state may not be updated because the state in pixel is not going to be updated.

SI 308 may be configured to receive the bits of bit stream 108 in descending order. Bit stream 108 may be fed into buffer circuitry 106 backwards so that the bit for light source 255 travels through the D flip-flops for all other light sources before reaching the D flip-flop for light source 255. Snooping circuitry 116 may be configured to read specific bit 118, which may correspond to a specific light source of light sources 104. Snooping circuitry 116 may be configured to determine the position of specific bit 118 by receiving the LED pointer X-Y coordinates from a register. The coordinates may indicate the location of the specific light source in an array, grid, and/or matrix of light sources 104. Snooping circuitry 116 may be configured to determine the position of specific bit 118 by using a map register to determine the stream position based on the row and column of the X-Y coordinates.

Snooping circuitry 116 may be configured to determine whether the specific light source will be on or off during the next frame based on the value of specific bit 118. When snooping circuitry 116 receives the high pulse of the update signal, snooping circuitry 116 may cause the ADC control logic, such as central logic circuitry 800, to determine the voltage drop across the specific light source.

Figure 10:
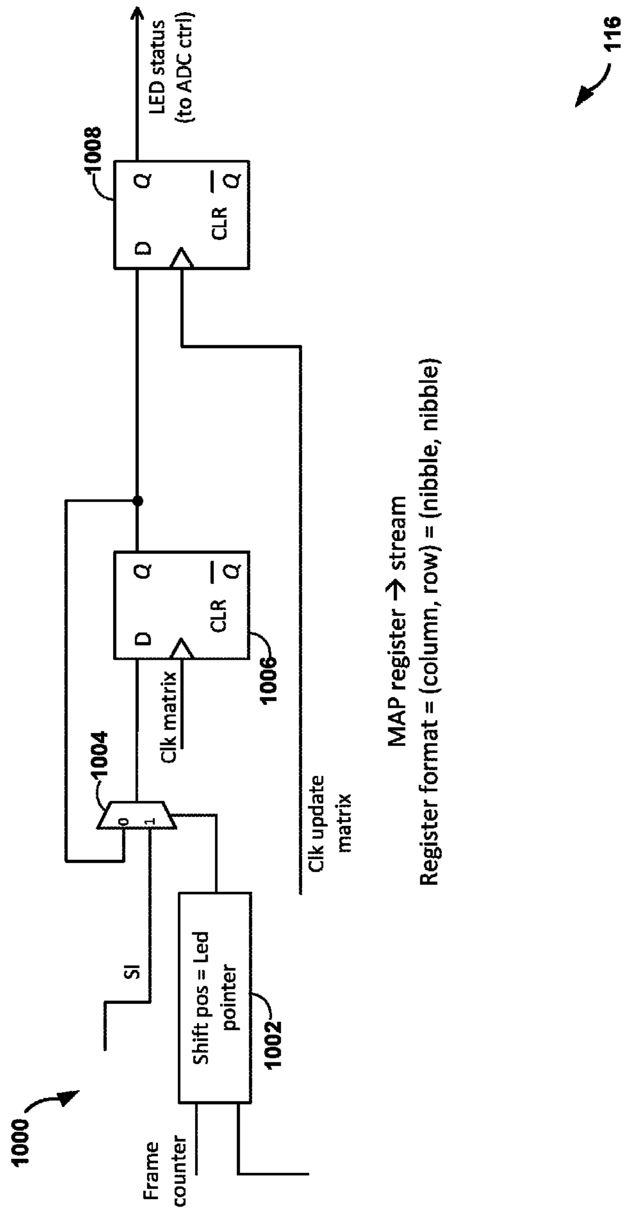
FIG. 10 is a block diagram of snooping circuitry and counter circuitry, in accordance with some examples of this disclosure.

FIG. 10 is a block diagram of snooping circuitry 116 and counter circuitry 1000, in accordance with some examples of this disclosure. The signal clk_matrix may be the serial interface clock used for the shift register, while the signal clk_update_matrix may be the clock used to load the shadow register. Device 100 may generate the update signal only if the frame integrity checks pass successfully. D flip-flop 1008 may be configured to store the value of the specific bit and may be updated by the clk_update_matrix in order to keep D flip-flop 1008 coherent with the shadow flip-flop (not shown in FIG. 10) in the pixel cell.

Counter circuitry 1000 may be configured to count a position of the specific bit as buffer circuitry receives the bit stream. Counter circuitry 1000 may be configured to cause multiplexer 1004 to read the specific bit in response to counting the position of the specific bit. When counter circuitry 1000 has counted to the position of the specific bit, shift register 1002 may deliver a high bit to multiplexer 1004, causing multiplexer 1004 to deliver the specific bit to D flip-flop 1006. For all bits other than the specific bit, shift register 1002 may deliver a low bit to multiplexer 1004, causing multiplexer 1004 to deliver the output of D flip-flop 1006 to the inputs of D flip-flop 1006. When D flip-flop 1008 receives a pulse of the update signal (i.e., "Clk update matrix"), D flip-flop 1008 may be configured to deliver the value of the specific bit to the ADC control logic circuitry.

Figure 11:
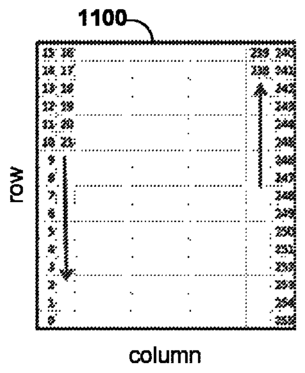
FIG. 11 is a diagram of an algorithm implemented by counter circuitry, in accordance with some examples of this disclosure.

FIG. 11 is a diagram of an algorithm implemented by counter circuitry, in accordance with some examples of this disclosure. Table 1100 illustrates that two hundred and fifty-six light sources may be arrayed in a grid or matrix format. The number associated with each light source may count up and down the rows of table 1100 from the leftmost column to the rightmost column. The D flip-flops of the buffer circuitry may have a similar arrangement to the arrangement of table 1100 to allow the buffer circuitry to receive the bit stream serially.

Figure 12:
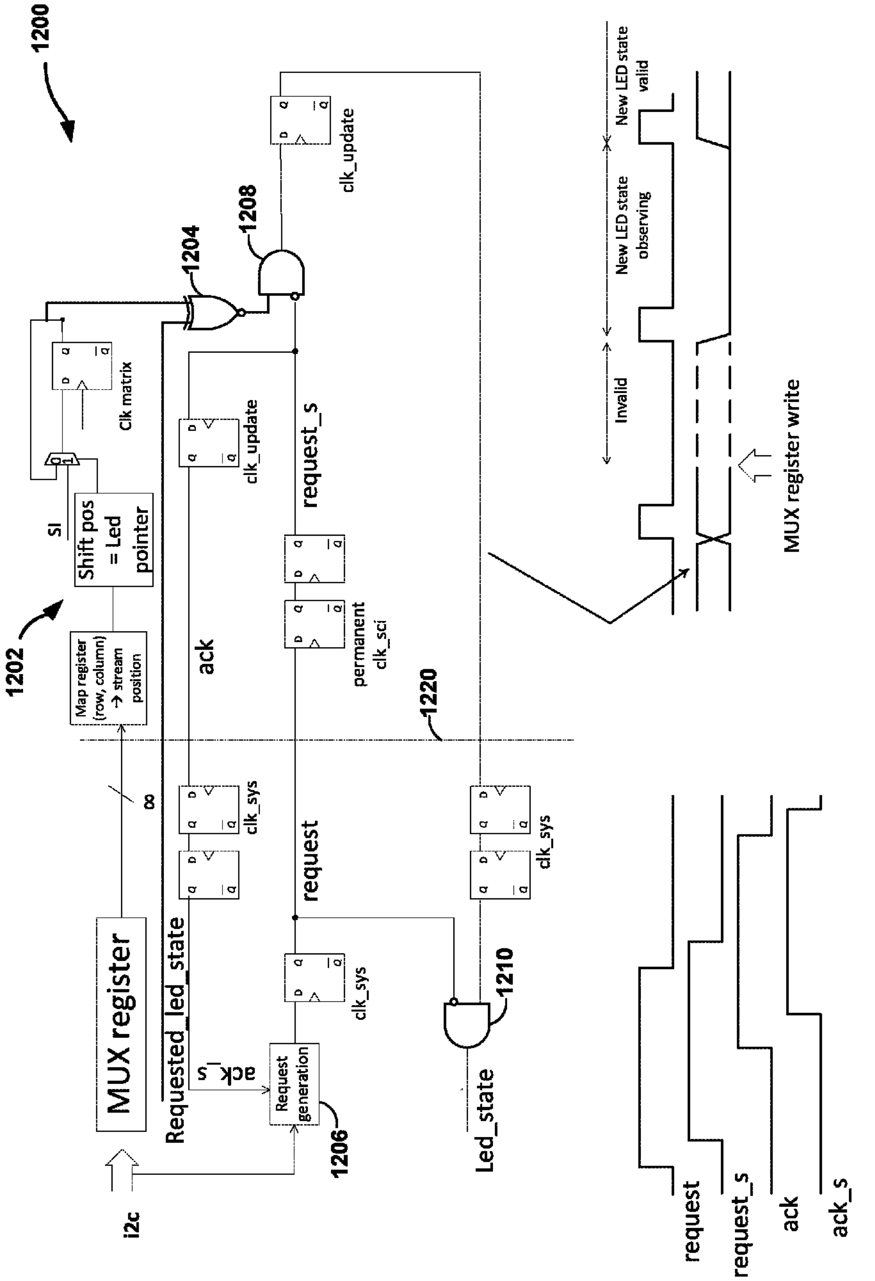
FIG. 12 is a block and circuit diagram of example snooping circuitry, in accordance with some examples of this disclosure.

FIG. 12 is a block and circuit diagram of example snooping circuitry 1200, in accordance with some examples of this disclosure. Snooping circuitry 1200 may receive the value of a specific bit when counter circuitry 1202 has counted to the position of the specific bit. XNOR gate 1204 may receive the value of the specific bit and a requested state (i.e., Requested_led_state) as inputs. When the value of the specific bit and the requested state have the same value, XNOR gate 1204 may output a high binary signal.

Request generation circuitry 1206 may be configured to generate a request signal (i.e., request) that may be delivered to AND gate 1208 as request_s. Based on the request_s and the output signal of XNOR gate 1204, AND gate 1208 may be configured to output a signal to AND gate 1210. AND gate 1210 may be configured to output a signal indicating a state of a specific light source.

Division 1220 may separate the circuitry that receives clk_sys on the left side of FIG. 12 from the circuitry that receives clk_update, permanent clk_sci, and Clk matrix on the right side of FIG. 12. Flip flops in FIG. 12 that are labeled clk_update may be configured to operate based on an update signal, i.e., a high pulse of an update signal. The pixel coordinates and the serial interface may run in two different clock domains. Synchronization between the clock domains may be accomplished via a request-acknowledge handshake mechanism.

Additionally, it is depicted how to handle the problem to have a selectable light source state search via the signal Requested_LED_state signal. In the previous diagram, it is depicted also how a change of pixel coordinates is handled. The signal labeled LED_state may be equal to '1' if the light source state is correct. The circuitry may immediately set this signal to '0' when a coordinate change is done and only after a complete new correct frame is transmitted. Therefore, the circuitry of FIG. 12 may receive the state of the new pixel under monitor, and then the circuitry may set the light source state to '1'.

Figure 13:
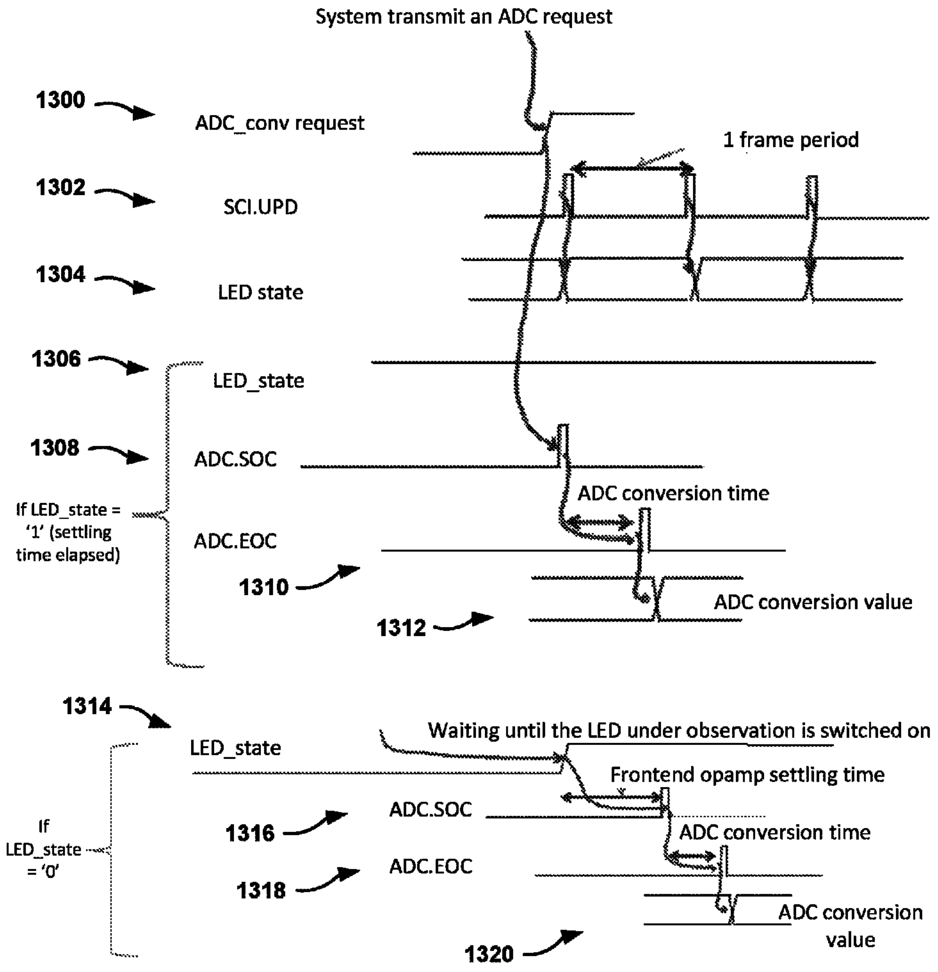
FIG. 13 is a timing diagram of an update signal and other signals if a first light source is on or off, in accordance with some examples of this disclosure.

FIG. 13 is a timing diagram of an update signal 1302 and other signals if a first light source is on or off, in accordance with some examples of this disclosure. A user may request a conversion on the pixel that is already selected. There are 2 cases: (i) the light source is already in the desired state, and the conversion starts immediately, and (ii) the light source is not in the desired state, and the monitor circuitry waits until the light source toggles and then the conversion starts. As shown in FIG. 13, a high value of conversion request signal 1300 may cause monitor circuitry to determine a voltage drop across the first light source in response to a high pulse of update signal 1302. The high pulse of update signal 1302 may cause the light source state signal 1304 to change.

Conversion request signal 1300 may cause a high pulse in start-of-conversion signal 1308 when light source state signal 1306 has a high value, indicating that the first light source is on. The high pulse in start-of-conversion signal 1308 may cause an ADC to begin converting an analog signal to converted signal 1312, where the analog signal indicates the voltage drop across the first light source. End-of-conversion signal 1310 may include a high pulse at the end of the conversion by the ADC. Converted signal 1312 may be a digital representation of the voltage drop across the first light source.

Conversion request signal 1300 may not cause a high pulse in start-of-conversion signal 1316 until light source state signal 1314 has a high value, indicating that the first light source is on. The high pulse of start-of-conversion signal 1316 may coincide with the next high pulse of update signal 1302 after light source state signal 1314 has a high value. End-of-conversion signal 1318 may include a high pulse at the end of the conversion by the ADC. Converted signal 1320 may be a digital representation of the voltage drop across the first light source.

Figure 14:
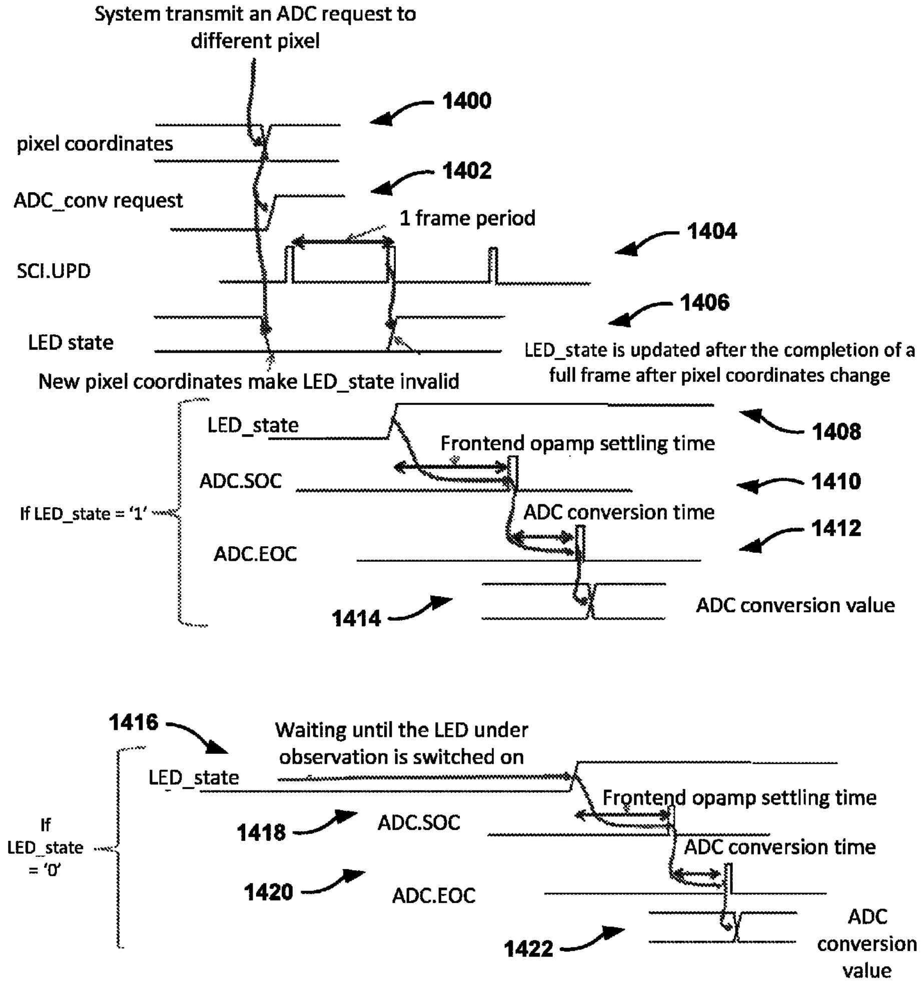
FIG. 14 is a timing diagram of an update signal and other signals if a second light source is on or off, in accordance with some examples of this disclosure.

FIG. 14 is a timing diagram of an update signal 1404 and other signals if a second light source is on or off, in accordance with some examples of this disclosure. A user may request a conversion and, at the same time, select a different pixel than the pixel that is already selected. The snooping circuitry may wait for the next complete frame to update the stored light source state to the new pixel. In other words, the conversion process may begin after the second high pulse of the update signal after the user requests a conversion. There are 2 cases: (i) the light source is already in the desired state, and the conversion starts immediately after the second high pulse of the update signal, and (ii) the light source is not in the desired state, and the monitor circuitry waits until the light source toggles and then the conversion starts.

Pixel coordinates signal 1400 may change if the system transmits a request for a pixel that is different than a previous pixel. The different pixel may include the second light source. The change in pixel coordinates signal 1400 may cause conversion request signal 1402 to change from a low value to a high value. The change in pixel coordinates signal 1400 may also cause light source state signal 1406 to change from a high value to a low value (i.e., an invalid state). Light source state signal 1406 may change back from a low value to a high value after two high pulses in update signal 1404.

If the second light source is on, light source state signal 1408 may cause a high pulse in start-of-conversion signal 1410 after the settling time for an ADC, which may include a frontend operational amplifier. In some examples, the ADC may have a settling time to allow for accurate sampling of the voltage drop by the ADC. End-of-conversion signal 1412 may include a high pulse at the end of the conversion by the ADC. Converted signal 1414 may be a digital representation of the voltage drop across the first light source.

If the second light source is off, conversion request signal 1402 may not cause a high pulse in start-of-conversion signal 1418 until light source state signal 1416 has a high value, indicating that the second light source is on. A high pulse in update signal 1404 and a high value of light source state signal 1416 may cause a high pulse in start-of-conversion signal 1410 after the settling time for a frontend operational amplifier. End-of-conversion signal 1420 may include a high pulse at the end of the conversion by the ADC. Converted signal 1422 may be a digital representation of the voltage drop across the first light source.

Figure 15:
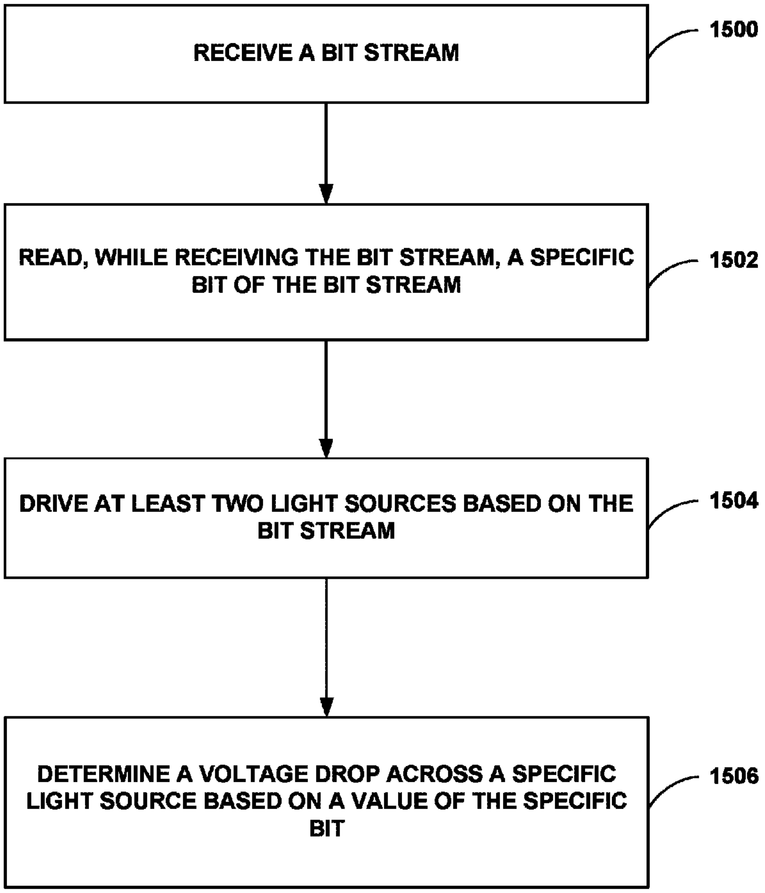
FIGS. 15 and 16 are flowcharts illustrating example techniques for determining a voltage drop across a light source, in accordance with some examples of this disclosure.
Figure 16:
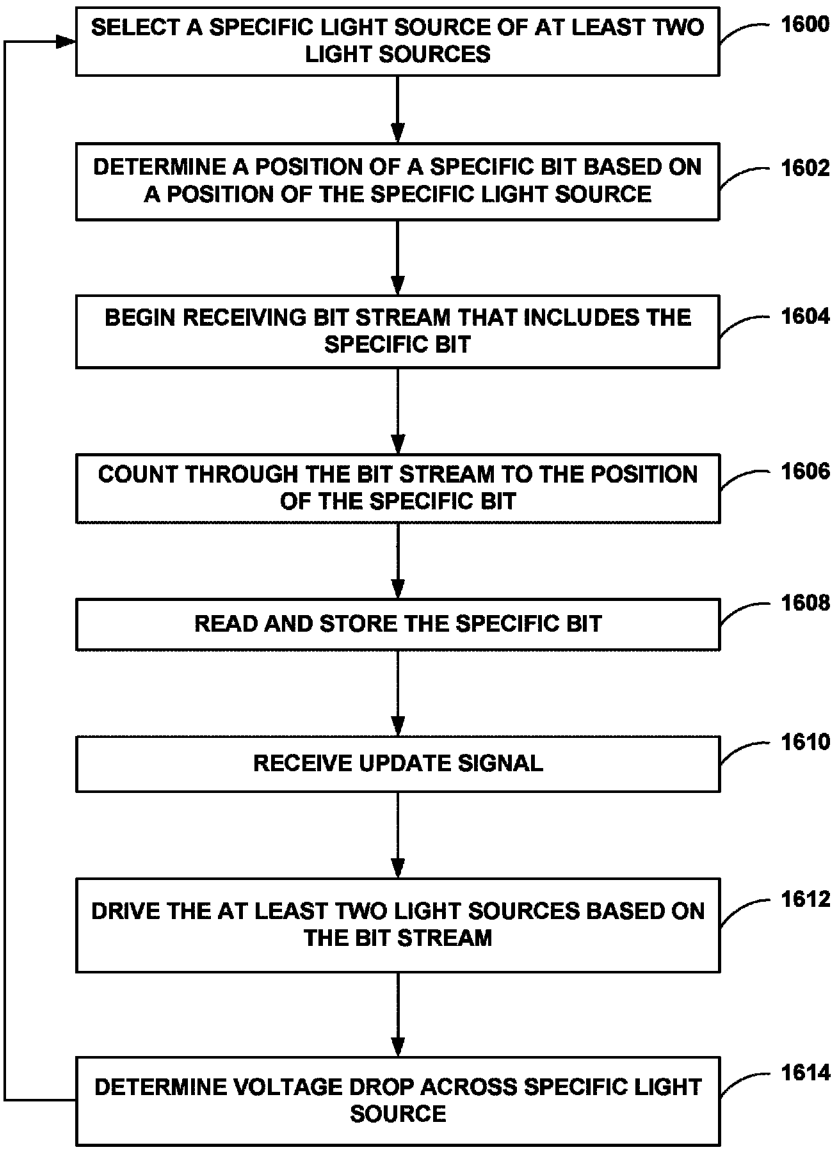

FIGS. 15 and 16 are flowcharts illustrating example techniques for determining a voltage drop across a light source, in accordance with some examples of this disclosure. The techniques of FIGS. 15 and 16 are described with reference to device 100 in FIG. 1, although other components, such as semiconductor device 310 in FIG. 3 and snooping circuitry 1200 in FIG. 12, may exemplify similar techniques.

The techniques of FIG. 15 include buffer circuitry 106 receiving bit stream 108 (1500). Buffer circuitry 106 may include a shift register configured to receive a frame of bit stream 108. Each flip flop of the shift register may be configured to receive each bit of the frame of bit stream 108. When buffer circuitry 106 has received the frame of bit stream 108, buffer circuitry 106 may be configured to receive an update signal indicating the end of the frame. The update signal may also indicate that the frame does not include any errors. In response to receiving the update signal, buffer circuitry 106 may be configured to deliver the frame of bit stream 108 to driver circuitry 110.

The techniques of FIG. 15 further include snooping circuitry 116 reading, while buffer circuitry 106 receives bit stream 108, specific bit 118 of bit stream 108 (1502). Snooping circuitry 116 may include counter circuitry configured to count the position of specific bit 118 in a frame of bit stream 108 as buffer circuitry 106 receives the frame. The counter circuitry may be configured to cause snooping circuitry 116 to read the value of specific bit 118 in response to counting the position of specific bit 118. In some examples, snooping circuitry 116 may be configured to read specific bit 118 as buffer circuitry 106 receives specific bit 118.

The techniques of FIG. 15 further include driver circuitry 110 driving light sources 104 based on bit stream 108 (1504). Driver circuitry 110 may be configured to receive the frame of bit stream 108 in response to buffer circuitry 106 receiving the update signal. In some examples, driver circuitry 110 may be configured to deliver an electrical current to a light source based on a high value of a corresponding bit in bit stream 108. Driver circuitry 110 may be configured to refrain from delivering an electrical current to a light source based on a low value of a corresponding bit in bit stream 108.

The techniques of FIG. 15 further include monitor circuitry 112 determining a voltage drop across a specific light source of light sources 104 based on a value of specific bit 118 (1506). Snooping circuitry 116 may be configured to compare the value of specific bit 118 to a requested state and cause monitor circuitry 112 to determine the voltage drop if the value of specific bit 118 and the requested state are equal. Snooping circuitry may include logic gates configured to compare the value of specific bit 118 and the requested state (e.g., snooping circuitry 1200 in FIG. 12). Monitor circuitry 112 may be configured to receive a voltage signal from driver circuitry 110, where the voltage signal indicates the voltage drop across the specific light source (e.g., light source 408 and switch 462 in FIG. 4B). Monitor circuitry 112 may include multiplexers that are configured to deliver the voltage signal from driver circuitry 110 to an ADC (e.g., multiplexers 802 and 804 in FIG. 8).

By reading the value of specific bit 118 as buffer circuitry 106 receives a frame of bit stream 108, snooping circuitry 116 may be configured to synchronize monitor circuitry 112 to determine the voltage drop. Snooping circuitry 116 may be configured to cause monitor circuitry 112 to determine the voltage drop in response to receiving an update signal, rather than waiting until after the update signal to determine the value of specific bit 118 or to determine whether the specific light source is on or off.

Other devices may include an external ADC, where the monitoring of the forward voltage (i.e., the voltage drop) may be implemented by multiplexing the output current source voltage of the driver circuitry to a pad in order to be sampled by an external ADC. Synchronization of the external ADC with the desired light source state may require that the external PWM/PDM/PFM generator be configured to trigger the state of conversion that must include the latency of the transmission and light source state update. An antialiasing filter (e.g., a low-pass filter) may be present at the external ADC inputs. A possible drawback is that the minimum on-state that can be monitored may be limited. Such a scheme may become more difficult to support when several voltages must be monitored. For example, there are four voltages per device and there may be three or four devices per system, meaning that as many as sixteen voltages are being sampled. Additionally, it may be difficult to account for transmission errors that cause the transmitted data to be rejected causing a mismatch of the light source state in the PWM/PDM/PFM generator and real one in the device.

Additionally or alternatively, another device may include an internal ADC. If the light source state information is stored locally in the pixel area and not available in the common circuitry where the ADC control logic is placed, a wire may run from each pixel down to the common circuitry, which may cause routing congestion issues in the already limited routing channel. The congestion may increase as the size of each light source decreases. It may consume area to have state information stored locally in the pixel area and a replica stored in the common area because a doubling of the memory elements is needed, resulting in a bigger area overhead. As the number of light sources in a device increases, the footprint of such a device may also increase. To have state information stored in the common area and then pixel cell driven by dedicated wire may result in routing congestion issue and bigger area overhead. It may also be difficult to provide a start of conversion signal for such a device.

A device of this disclosure may synchronize an internal ADC to the on-the-fly changing light source status. The device may monitor the incoming data stream and extract a specific bit corresponding to the specific light source under diagnosis. This way the ADC control logic has continuously the correct information about the actual light source status and it can trigger an ADC conversion in the right moment. In the event of a transmission error for the bit stream, the light source state may be not updated. If the specific light source changes state during the conversion the ADC controller may abort the conversion and either execute a retry or issue an error to the system possibly indicating that the duty cycle is too small. The device may include a small number of logic gates, which may be an advantage in the terms of area compared to other devices. Additionally, the device may not include wires in the matrix area of the light sources without much impact on matrix route-ability.

The techniques of FIG. 16 include controller circuitry 120, monitor circuitry 112, and/or snooping circuitry 116 selecting a specific light source of light sources 104 (1600). In some examples, device 100 may be configured to select the next light source based on the positions of the light sources. For example, device 100 may select light source n, followed by light source n+1, followed by light source n+2, etc. The techniques of FIG. 16 further include controller circuitry 120, monitor circuitry 112, and/or snooping circuitry 116 determining a position of specific bit 118 based on a position of the specific light source (1602). Device 100 may include mapping circuitry configured to convert the position of the specific light source to the position of specific bit 118, or vice versa. The mapping circuitry may include a lookup table matching the X-Y coordinates of light sources 104 and positions of bits in bit stream 108.

The techniques of FIG. 16 further include buffer circuitry 106 beginning to receive bit stream 108 that includes specific bit 118 (1604). The techniques of FIG. 16 further include snooping circuitry 116 and/or counter circuitry counting through bit stream 108 to the position of specific bit 118 (1606). The counter circuitry may be configured to clear the count in response to receiving an update signal and to being counting at the start of each frame. When the counter circuitry reaches the position of specific bit 118, the techniques of FIG. 16 further include snooping circuitry 116 reading and storing specific bit 118 (1608). Snooping circuitry 116 may include a multiplexer configured to receive bit stream 108 as an input and to output only the value of specific bit 118. In some examples, snooping circuitry 116 may be configured to store the value of specific bit 118 in a flip flop.

The techniques of FIG. 16 further include buffer circuitry 106 and/or snooping circuitry 116 receiving an update signal, such as an active period and/or high pulse of the update signal (1610). When buffer circuitry 106 receives the update signal, buffer circuitry 106 may be configured to deliver a frame of bit stream 108 to driver circuitry 110. When snooping circuitry 116 receives the update signal, snooping circuitry 116 may be configured to cause monitor circuitry 112 to determine the voltage drop across the specific light source. The techniques of FIG. 16 further include driver circuitry 110 driving light sources 104 based on bit stream 108 (1612). The techniques of FIG. 16 further include monitor circuitry 112 determining the voltage drop across the specific light source (1614). After monitor circuitry 112 determines the voltage drop, controller circuitry 120, monitor circuitry 112, and/or snooping circuitry 116 may select another light source of light sources 104 for measuring the voltage drop (1600).

The techniques of this disclosure may be implemented in a device or article of manufacture comprising a computer-readable storage medium. The term “processing circuitry,” as used herein may refer to any of the foregoing structure or any other structure suitable for processing program code and/or data or otherwise implementing the techniques described herein. Elements of device 100, buffer circuitry 106, driver circuitry 110, monitor circuitry 112, snooping circuitry 116, and/or controller circuitry 120 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

Device 100, buffer circuitry 106, driver circuitry 110, monitor circuitry 112, snooping circuitry 116, and/or controller circuitry 120 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of device 100, buffer circuitry 106, driver circuitry 110, monitor circuitry 112, snooping circuitry 116, and/or controller circuitry 120 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

A device includes at least two light sources, buffer circuitry configured to receive a bit stream, and driver circuitry configured to receive the bit stream from the buffer circuitry and to drive the at least two light sources based on the bit stream. In some examples, the device also includes monitor circuitry configured to determine a voltage drop across each light source of the at least two light sources and snooping circuitry configured to read, as the buffer circuitry receives the bit stream, a specific bit of the bit stream and to cause the monitor circuitry to determine a voltage drop across the specific light source based on a value of the specific bit.

Example 2

The device of example 1, wherein the snooping circuitry is further configured to receive an update signal indicating that the buffer circuitry has received a first frame of the bit stream, wherein the snooping circuitry is configured to cause the monitor circuitry to determine the voltage drop across the specific light source based on receiving the update signal.

Example 3

The device of examples 1-2 or any combination thereof, wherein the bit stream includes the first frame and a second frame, and wherein the buffer circuitry is further configured to receive the update signal and to deliver the first frame of the bit stream to the driver circuitry in response to receiving the update signal. The buffer circuitry is further configured to receive the second frame of the bit stream after receiving the update signal.

Example 4

The device of examples 1-3 or any combination thereof, wherein the snooping circuitry is further configured to determine a position of the specific bit in a frame of the bit stream based on a position of the specific light source in a matrix of the at least two light sources.

Example 5

The device of examples 1-4 or any combination thereof, further including counter circuitry configured to count a position of the specific bit as the buffer circuitry receives the frame and to cause the snooping circuitry to read the specific bit in response to counting the position of the specific bit.

Example 6

The device of examples 1-5 or any combination thereof, wherein the snooping circuitry is configured to determine the position of the specific bit by at least accessing a lookup table associating positions of bits in the bit stream and positions of light sources in the matrix.

Example 7

The device of examples 1-6 or any combination thereof, wherein the voltage drop across the specific light is an analog signal, wherein the monitor circuitry is configured to determine the voltage drop by at least converting the analog signal to a digital signal.

Example 8

The device of examples 1-7 or any combination thereof, wherein the monitor circuitry is configured to determine that the specific light is on and to determine the voltage drop across the specific light in response to determining that the specific light is on.

Example 9

The device of examples 1-8 or any combination thereof, wherein the bit stream includes a series of digital bits, wherein each bit of the bit stream is a command signal for a light source of the at least two light sources.

Example 10

The device of examples 1-9 or any combination thereof, wherein the bit stream includes a first frame, a second frame, and a third frame, wherein the snooping circuitry is configured to read the specific bit as the buffer circuitry receives the first frame, and wherein the snooping circuitry is configured to cause the monitor circuitry to determine the voltage drop across the specific light source as the buffer circuitry receives the second frame. The snooping circuitry is further configured to read, as the buffer circuitry receives the second frame, the specific bit in the second frame and to cause the monitor circuitry to determine, as the buffer circuitry receives the third frame, a second voltage drop across the specific light source based on a value of the specific bit in the second frame.

Example 1

A method including receiving a bit stream and reading, while receiving the bit stream, a specific bit of the bit stream. The method further includes driving at least two light sources based on the bit stream and determining a voltage drop across a specific light source of the at least two light sources based on a value of the specific bit.

Example 12

The method of example 11, further including receiving an update signal indicating that a first frame of the bit stream has been received, wherein determining the voltage drop across the specific light source is based on receiving the update signal.

Example 13

The method of examples 11-12 or any combination thereof, wherein the bit stream includes the first frame and a second frame, wherein the voltage drop is a second voltage drop, and wherein the update signal is a first update signal. The method further includes reading, while receiving the second frame, a second bit of the bit stream and receiving a second update signal indicating that the second frame has been received. The method also includes determining a second voltage drop across a second light source of the at least two light sources based on a value of the second bit.

Example 14

The method of examples 11-13 or any combination thereof, further including determining a position of the specific bit in a frame of the bit stream based on a position of the specific light source in a matrix of the at least two light sources.

Example 15

The method of examples 11-14 or any combination thereof, further including counting the position of the specific bit while receiving the frame and reading the specific bit in response to counting the position of the specific bit.

Example 16

The method of examples 11-15 or any combination thereof, wherein determining the position of the specific bit includes accessing a lookup table associating positions of bits in the bit stream and positions of light sources in the matrix.

Example 17

The method of examples 11-16 or any combination thereof, wherein the voltage drop across the specific light is an analog signal, wherein determining the voltage drop includes converting the analog signal to a digital signal.

Example 18

The method of examples 11-17 or any combination thereof, further including determining that the specific light is on and determining the voltage drop across the specific light in response to determining that the specific light is on.

Example 19

The method of examples 11-18 or any combination thereof, wherein the bit stream includes a first frame, a second frame, and a third frame, wherein reading the specific bit occurs while receiving the first frame, wherein determining the voltage drop across the specific light source occurs while receiving the second frame. The method further includes reading, while receiving the second frame, the specific bit in the second frame and determining, while receiving the third frame, a second voltage drop across the specific light source based on a value of the specific bit in the second frame.

Example 20

A device includes at least two light sources, buffer circuitry configured to receive a bit stream, and driver circuitry configured to receive the bit stream from the buffer circuitry and to drive the at least two light sources based on the bit stream. The device further includes monitor circuitry configured to determine a voltage drop across each light source of the at least two light sources. The device also includes snooping circuitry configured to read, as the buffer circuitry receives the bit stream, a specific bit of the bit stream and to cause the monitor circuitry to determine a voltage drop across the specific light source based on a value of the specific bit. The device includes controller circuitry configured to determine whether the voltage drop across the specific light source is within an acceptable voltage window and to cause the driver circuitry to increase or decrease the voltage drop across the specific light source in response to determining that the voltage drop across the specific light source is not within the acceptable voltage window.

Various examples of the disclosure have been described. Any combination of the described systems, operations, or functions is contemplated. These and other examples are within the scope of the following claims.

What is claimed is:

1. A device comprising:
at least two light sources;
buffer circuitry configured to receive a bit stream;
driver circuitry configured to:
receive the bit stream from the buffer circuitry; and
drive the at least two light sources based on the bit stream;
monitor circuitry configured to determine a voltage drop across each light source of the at least two light sources; and
snooping circuitry configured to:
read, as the buffer circuitry receives the bit stream, a specific bit of the bit stream; and
cause the monitor circuitry to determine a voltage drop across the specific light source based on a value of the specific bit.

2. The device of claim 1, wherein the snooping circuitry is further configured to receive an update signal indicating that the buffer circuitry has received a first frame of the bit stream, wherein the snooping circuitry is configured to cause the monitor circuitry to determine the voltage drop across the specific light source based on receiving the update signal.

3. The device of claim 2, wherein the bit stream includes the first frame and a second frame, and wherein the buffer circuitry is further configured to:
receive the update signal;
deliver the first frame of the bit stream to the driver circuitry in response to receiving the update signal; and
receive the second frame of the bit stream after receiving the update signal.

4. The device of claim 1, wherein the snooping circuitry is further configured to determine a position of the specific bit in a frame of the bit stream based on a position of the specific light source in a matrix of the at least two light sources.

5. The device of claim 4, further comprising counter circuitry configured to:
count a position of the specific bit as the buffer circuitry receives the frame; and
cause the snooping circuitry to read the specific bit in response to counting the position of the specific bit.

6. The device of claim 4, wherein the snooping circuitry is configured to determine the position of the specific bit by at least accessing a lookup table associating positions of bits in the bit stream and positions of light sources in the matrix.

7. The device of claim 1, wherein the voltage drop across the specific light is an analog signal, wherein the monitor circuitry is configured to determine the voltage drop by at least converting the analog signal to a digital signal.

8. The device of claim 1, wherein the monitor circuitry is configured to:
determine that the specific light is on; and
determine the voltage drop across the specific light in response to determining that the specific light is on.

9. The device of claim 1, wherein the bit stream includes a series of digital bits, wherein each bit of the bit stream is a command signal for a light source of the at least two light sources.

10. The device of claim 1, wherein the bit stream includes a first frame, a second frame, and a third frame, wherein the snooping circuitry is configured to read the specific bit as the buffer circuitry receives the first frame, wherein the snooping circuitry is configured to cause the monitor circuitry to determine the voltage drop across the specific light source as the buffer circuitry receives the second frame, and wherein the snooping circuitry is further configured to:
read, as the buffer circuitry receives the second frame, the specific bit in the second frame; and
cause the monitor circuitry to determine, as the buffer circuitry receives the third frame, a second voltage drop across the specific light source based on a value of the specific bit in the second frame.

11. A method comprising:
receiving a bit stream;
reading, while receiving the bit stream, a specific bit of the bit stream;
driving at least two light sources based on the bit stream; and
determining a voltage drop across a specific light source of the at least two light sources based on a value of the specific bit.

12. The method of claim 11, further comprising receiving an update signal indicating that a first frame of the bit stream has been received, wherein determining the voltage drop across the specific light source is based on receiving the update signal.

13. The device of claim 12, wherein the bit stream includes the first frame and a second frame, wherein the voltage drop is a second voltage drop, and wherein the update signal is a first update signal, the method further comprising:
reading, while receiving the second frame, a second bit of the bit stream;
receiving a second update signal indicating that the second frame has been received; and
determining a second voltage drop across a second light source of the at least two light sources based on a value of the second bit.

14. The method of claim 11, further comprising determining a position of the specific bit in a frame of the bit stream based on a position of the specific light source in a matrix of the at least two light sources.

15. The method of claim 14, further comprising:
counting the position of the specific bit while receiving the frame; and
reading the specific bit in response to counting the position of the specific bit.

16. The method of claim 14, wherein determining the position of the specific bit includes accessing a lookup table associating positions of bits in the bit stream and positions of light sources in the matrix.

17. The method of claim 11, wherein the voltage drop across the specific light is an analog signal, wherein determining the voltage drop includes converting the analog signal to a digital signal.

18. The method of claim 11, further comprising:

determining that the specific light is on; and determining the voltage drop across the specific light in response to determining that the specific light is on.

19. The method of claim 11, wherein the bit stream includes a first frame, a second frame, and a third frame, wherein reading the specific bit occurs while receiving the first frame, wherein determining the voltage drop across the specific light source occurs while receiving the second frame, the method further comprising:

reading, while receiving the second frame, the specific bit in the second frame; and determining, while receiving the third frame, a second voltage drop across the specific light source based on a value of the specific bit in the second frame.

20. A device comprising:

at least two light sources;

buffer circuitry configured to receive a bit stream;

driver circuitry configured to:

receive the bit stream from the buffer circuitry; and drive the at least two light sources based on the bit stream:

monitor circuitry configured to determine a voltage drop across each light source of the at least two light sources;

snooping circuitry configured to:

read, as the buffer circuitry receives the bit stream, a specific bit of the bit stream; and cause the monitor circuitry to determine a voltage drop across the specific light source based on a value of the specific bit; and controller circuitry configured to:

determine whether the voltage drop across the specific light source is within an acceptable voltage window; and cause the driver circuitry to increase or decrease the voltage drop across the specific light source in response to determining that the voltage drop across the specific light source is not within the acceptable voltage window.

* * * * *